United States Patent
Yamamoto

(10) Patent No.: US 8,767,711 B2
(45) Date of Patent: Jul. 1, 2014

(54) BASE STATION APPARATUS, BASE STATION APPARATUS-USE SIGNAL PROCESSING APPARATUS, PHY PROCESSING APPARATUS, AND MAC PROCESSING APPARATUS

(75) Inventor: Takashi Yamamoto, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 122 days.

(21) Appl. No.: 13/499,962

(22) PCT Filed: Oct. 6, 2010

(86) PCT No.: PCT/JP2010/067543
§ 371 (c)(1),
(2), (4) Date: Apr. 18, 2012

(87) PCT Pub. No.: WO2011/043372
PCT Pub. Date: Apr. 14, 2011

(65) Prior Publication Data
US 2012/0201218 A1 Aug. 9, 2012

(30) Foreign Application Priority Data

Oct. 7, 2009 (JP) ................................ 2009-233373
Oct. 7, 2009 (JP) ................................ 2009-233873

(51) Int. Cl.
*H04J 3/06* (2006.01)
(52) U.S. Cl.
USPC ........................................................ 370/350
(58) Field of Classification Search
USPC ......... 370/328–330, 350, 503, 509, 510, 512, 370/516, 304, 324, 478; 375/356, 354; 455/500, 502, 403, 422.1, 464, 450, 455/509
See application file for complete search history.

(56) References Cited

U.S. PATENT DOCUMENTS

| | | | |
|---|---|---|---|
| 6,310,866 B1 * | 10/2001 | Kronestedt et al. | 370/330 |
| 2008/0153434 A1 * | 6/2008 | Akiyama et al. | 455/103 |
| 2008/0273521 A1 * | 11/2008 | Shao et al. | 370/350 |
| 2011/0222560 A1 * | 9/2011 | Biederman et al. | 370/503 |

FOREIGN PATENT DOCUMENTS

| | | |
|---|---|---|
| JP | 2009-177532 | 8/2009 |
| JP | 2009-212946 | 9/2009 |

* cited by examiner

*Primary Examiner* — Edan Orgad
*Assistant Examiner* — Saumit Shah
(74) *Attorney, Agent, or Firm* — Drinker Biddle & Reath LLP

(57) ABSTRACT

To prevent an occurrence of mismatch in processing timing between a PHY layer and a MAC layer that may occur when a synchronization process for inter-base-station synchronization is performed by a PHY processing apparatus. A base station apparatus includes a PHY processing apparatus that performs a communication process related to the PHY layer, and a MAC processing apparatus that performs a communication process related to the MAC layer. The PHY processing apparatus includes a synchronization processing unit that performs a synchronization process for synchronizing a communication frame processing timing of the PHY processing apparatus with a communication frame processing timing of other base station apparatus serving as the synchronization source. The MAC processing apparatus acquires, from the PHY processing apparatus, synchronization information for synchronizing a communication frame processing timing of the MAC processing apparatus with the communication frame processing timing of the PHY processing apparatus.

14 Claims, 17 Drawing Sheets

BASE STATION APPARATUS, BASE STATION APPARATUS-USE SIGNAL PROCESSING APPARATUS, PHY PROCESSING APPARATUS, AND MAC PROCESSING APPARATUS

TECHNICAL FIELD

The present invention relates to a base station apparatus, a base station apparatus-use signal processing apparatus, a PHY processing apparatus, and a MAC processing apparatus.

BACKGROUND ART

A large number of base station apparatuses, which communicate with terminal devices (wireless communication terminals), are installed in order to cover a wide area. Here, among a plurality of base station apparatuses, inter-base-station synchronization for synchronizing communication frame timing or the like is performed in some cases.

For example, Patent Literature 1 discloses that the inter-base-station synchronization is performed by using wireless reception wave from other base station apparatus serving as the synchronization source.

CITATION LIST

Patent Literature

Patent Literature 1: Japanese Unexamined Patent Application Publication No. 2009-177532

SUMMARY OF INVENTION

Technical Problem

The inter-base-station synchronization synchronizes the base station apparatuses with one another as to the communication frame timing, the communication frequency (subcarrier frequency) or the like. The correction of timing or frequency can be carried out by a PHY layer where modulation, demodulation and the like are performed. Therefore, it is considered that a synchronization processing unit for the inter-base-station synchronization is preferably provided to a PHY processing apparatus (a so-called PHY unit) that performs a process related to the communicational PHY layer. In this case, for example, a modulator circuit or a demodulator circuit provided to the PHY processing apparatus can correct the synchronization error (as to timing or frequency) with other base station apparatus.

However, when the processing timing of the communication frame in the PHY processing apparatus is excessively varied so as to synchronize with the processing timing of the communication frame in the other base station apparatus for performing the inter-base-station synchronization, a problem arises as to the relationship with a MAC processing apparatus (a so-called MAC unit) that performs processes related to a MAC layer, which is a higher level layer with respect to the PHY layer.

That is, when the processing timing of the communication frame in the PHY layer is varied for the inter-base-station synchronization, a mismatch occurs between the PHY layer and the MAC layer as to the processing timing of the communication frame.

When such a mismatch occurs and, for example, the processing timing of a frame in the PHY layer lags behind the processing timing in the MAC layer, the process in the MAC layer precedes. This may cause excessive information more than necessary to be supplied from the MAC layer to the PHY layer.

Conversely, when the processing timing of the frame in the PHY layer precedes the processing timing process in the MAC layer, the PHY layer may be incapable of obtaining necessary information from the MAC layer because of the delayed processing of the MAC layer.

An object of the present invention in consideration of the foregoing is to prevent a mismatch of the processing timing between the PHY layer and the MAC layer that may possibly occur when the synchronization process for the inter-base-station synchronization is performed by the PHY layer (PHY processing apparatus).

Further, even in a case where the inter-base-station synchronization is once performed among a plurality of base station apparatuses, the synchronism may be lost while the base station apparatuses are in operation. For example, when a plurality of base station apparatuses are different from one another in clock accuracy, even when the operation timing or the communication frequency are synchronized, a synchronization error will occur again with the course of time.

Such a problem may be addressed by performing regular resynchronization even when the base station apparatuses are communicating with the terminal devices. Thus, since resynchronization is repeatedly performed even when the synchronization error occurs during the communication, the inter-base-station synchronization can substantially be maintained.

Here, in order for a base station apparatus to again perform the inter-base-station synchronization when it is communicating with a terminal device, the base station apparatus must receive a transmission signal from other base station apparatus while communicating with the terminal device.

However, when a base station apparatus attempts to receive a transmission signal from other base station apparatus when the base station apparatus is communicating with a terminal device, the primal communication between the base station apparatus and the terminal device is disadvantageously affected. Accordingly, for example, when the inter-base-station synchronization is frequently performed, though the synchronization accuracy improves, the quality of primal communication between the base station apparatus and the terminal devices is impaired because of the frequent reception of the transmission signal from the other base station apparatus. On the other hand, when the frequency of performing the inter-base-station synchronization is reduced, though a reduction in the communication quality with the terminal devices can be suppressed, the synchronization accuracy is impaired.

Accordingly, in a case where the frequency of performing the process of the inter-base-station synchronization is fixed, and for example, where the inter-base-station synchronization process is performed at a certain period on a regular basis, any of the aforementioned problems will disadvantageously occur when the frequency is inappropriate.

Further, such a disadvantage is not limited to the reception of a transmission signal from other base station apparatus for the purpose of the inter-base-station synchronization. This disadvantage is common to those cases where a base station apparatus attempts to periodically receive a transmission signal from other base station apparatus when the base station apparatus is communicating with a terminal device.

Accordingly, another object of the present invention in consideration of the foregoing is to solve the aforementioned disadvantages.

Solution to Problem (1) The present invention provides a base station apparatus, including: a PHY processing apparatus that performs a process related to a communicational PHY layer; and a MAC processing apparatus that performs a process related to a communicational MAC layer, wherein the PHY processing apparatus includes a synchronization processing unit that performs a synchronization process for synchronizing a communication frame processing timing of the PHY processing apparatus with a communication frame processing timing of other base station apparatus serving as a synchronization source, and the MAC processing apparatus acquires, from the PHY processing apparatus, synchronization information for synchronizing a communication frame processing timing of the MAC processing apparatus with the communication frame processing timing of the PHY processing apparatus.

According to the present invention, even when a synchronization process for synchronizing with a communication frame processing timing of the other base station apparatus is performed by the PHY processing apparatus serving as the synchronization source, since the MAC processing apparatus acquires, from the PHY processing apparatus, synchronization information for achieving inter PHY-MAC synchronization, the inter PHY-MAC synchronization can be achieved.

Hence, according to the present invention, an occurrence of mismatch in frame processing timing between the PHY processing apparatus and the MAC processing apparatus can be prevented.

(2) The MAC processing apparatus includes a control unit that controls a timing at which a transmission suspend process to a terminal device and/or a reception suspend process from the terminal device is/are to be performed. In this case, in a state where the inter PHY-MAC synchronization is achieved, the MAC processing apparatus can control the timing at which a transmission suspend process to a terminal device and/or a reception suspend process from the terminal device is/are to be performed.

(3) The MAC processing apparatus includes a resource allocation control unit that controls resource allocation in a communication frame, and the resource allocation control unit restricts the resource allocation for a period during which the transmission suspend process to the terminal device and/or the reception suspend process from the terminal device is/are to be performed. In this case, in a state where the inter PHY-MAC synchronization is achieved, the MAC processing apparatus can restrict the resource allocation for a period during which the transmission suspend process to the terminal device and/or the reception suspend process from the terminal device is/are to be performed.

(4) Preferably, the transmission suspend process to the terminal device and/or the reception suspend process from the terminal device is/are performed for receiving a signal transmitted from the other base station apparatus. In this case, the signal transmitted from the other base station apparatus can be received during the suspend process.

(5) Preferably, the synchronization processing unit calculates an error between its own communication frame processing timing and the communication frame processing timing of the other base station apparatus based on the signal transmitted from the other base station apparatus serving as the synchronization source, and corrects the communication frame processing timing of the PHY processing apparatus based on the error, to thereby perform the synchronization process. In this case, the synchronization process can be performed based on the signal transmitted from the other base station apparatus.

(6) Preferably, the MAC processing apparatus includes a synchronization control unit that controls a timing for causing the synchronization processing unit to execute the synchronization process, to report the causing the synchronization processing unit to execute the synchronization process to the PHY processing apparatus, the synchronization processing unit of the PHY processing apparatus calculates the error between its own communication frame processing timing and the communication frame processing timing of the other base station apparatus based on the transmission signal received from the other base station apparatus according to the reported timing, and corrects the communication frame processing timing of the PHY processing apparatus based on the error, to thereby perform the synchronization process. In this case, in a state where the inter PHY-MAC synchronization is achieved, while the MAC processing apparatus controls the timing of the synchronization process, the synchronization processing unit on the PHY processing apparatus side can execute the synchronization process.

(7) Preferably, the synchronization control unit adaptively control the timing for causing the synchronization processing unit to execute the synchronization process. In this case, the synchronization control unit of the MAC unit can adaptively control the timing of the synchronization process.

(8) The PHY processing apparatus controls a timing for causing the synchronization processing unit to execute the synchronization process, the synchronization processing unit calculates the error between its own communication frame processing timing and the communication frame processing timing of the other base station apparatus based on the transmission signal received from the other base station apparatus according to the timing, and corrects the communication frame processing timing for the PHY processing apparatus based on the error, to thereby perform the synchronization process. In this case, the PHY processing apparatus can execute the synchronization process while controlling the timing of the synchronization process.

(9) In accordance with another aspect of the present invention, there is provided a base station apparatus-use signal processing apparatus, including: a PHY processing apparatus that performs a process related to a communicational PHY layer; a MAC processing apparatus that performs a process related to a communicational MAC layer, wherein the PHY processing apparatus includes a synchronization processing unit that performs a synchronization process for synchronizing a communication frame processing timing of the PHY processing apparatus with a communication frame processing timing of other base station apparatus serving as a synchronization source, and the MAC processing apparatus acquires, from the PHY processing apparatus, synchronization information for synchronizing the communication frame processing timing of the MAC processing apparatus with the communication frame processing timing of the PHY processing apparatus.

(10) In accordance with another aspect of the present invention, there is provided a PHY processing apparatus that performs a process related to a communicational PHY layer, including: a synchronization processing unit that performs a synchronization process for synchronizing a communication frame processing timing of the PHY processing apparatus with a communication frame processing timing of other base station apparatus serving as a synchronization source, wherein the PHY processing apparatus reports, to a MAC processing apparatus, synchronization information for synchronizing a communication frame processing timing of the MAC processing apparatus that performs a processing related to a communicational MAC layer with the communication frame processing timing of the PHY processing apparatus.

(11) In accordance with another aspect of the present invention, there is provided a MAC processing apparatus that performs a process related to a communicational MAC layer, wherein the MAC processing apparatus acquires synchronization information from a PHY processing apparatus that has a function of performing a synchronization process for achieving synchronization with a communication frame processing timing of other base station apparatus serving as a synchronization source, and the synchronization information is information for synchronizing a communication frame processing timing of the MAC processing apparatus with a communication frame processing timing of the PHY processing apparatus.

(12) In accordance with still another aspect of the present invention, there is provided a base station apparatus, including: a PHY processing apparatus that performs a process related to a communicational PHY layer; and a MAC processing apparatus that performs a process related to a communicational MAC layer, wherein the PHY processing apparatus includes a processing unit that processes a transmission signal from other base station apparatus, the MAC processing apparatus includes a control unit that controls a timing at which the transmission signal from the other base station apparatus is processed at the processing unit of the PHY processing apparatus, to report the timing to the PHY processing apparatus, the processing unit of the PHY processing apparatus generates report information used for controlling the timing based on the transmission signal received from the other base station apparatus according to the timing, and reports the report information to the MAC processing apparatus, and the control unit of the MAC processing apparatus controls the timing based on the report information reported by the PHY processing apparatus.

According to the present invention, the processing unit of the PHY processing apparatus generates report information that is in accordance with the status of the transmission signal from the other base station apparatus. Then, since the control unit of the MAC processing apparatus controls the timing based on the report information reported by the PHY processing apparatus, it becomes possible to achieve the timing control that is in accordance with the status of the transmission signal from the other base station apparatus.

Hence, according to the present invention, the timing at which the transmission signal from the other base station apparatus is processed can appropriately be controlled.

(13) Preferably, the processing unit of the PHY processing apparatus includes a synchronization processing unit that performs a synchronization process for achieving inter-base-station synchronization with the other base station apparatus based on the transmission signal from the other base station apparatus. In this case, as a process of the transmission signal from the other base station apparatus, the synchronization process is performed.

(14) Preferably, the processing unit generates the report information based on a synchronization error between itself and the other base station apparatus. In this case, the timing can be controlled in accordance with the synchronization error.

(15) Preferably, the control unit of the MAC processing apparatus sets a period during which the synchronization process is performed to be shorter as the synchronization error indicated by the report information is greater. In this case, when the synchronization error is great, the synchronization process can frequently be performed, so that the synchronization error is maintained at a small value.

(16) Preferably, the processing unit of the PHY processing apparatus includes a measurement processing unit that performs a process of measuring the signal from the other base station apparatus. In this case, as the process of the transmission signal from the other base station apparatus, the measurement process of the signal from the other base station apparatus is performed.

(17) In accordance with still another aspect of the present invention, there is provided a base station apparatus-use signal processing apparatus, including: a PHY processing apparatus that performs a process related to a communicational PHY layer; and a MAC processing apparatus that performs a process related to a communicational MAC layer, wherein the PHY processing apparatus includes a processing unit that processes a transmission signal from other base station apparatus, the MAC processing apparatus includes a control unit that controls a timing at which the transmission signal from the other base station apparatus is processed at the processing unit of the PHY processing apparatus, to report the timing to the PHY processing apparatus, the processing unit of the PHY processing apparatus generates report information used for controlling the timing based on the transmission signal received from the other base station apparatus according to the timing, and reports the report information to the MAC processing apparatus, and the control unit of the MAC processing apparatus controls the timing based on the report information reported by the PHY processing apparatus.

(18) In accordance with still another aspect of the present invention, there is provided a PHY processing apparatus that performs a process related to a communicational PHY layer, including a processing unit that processes a transmission signal from other base station apparatus, wherein the processing unit processes the transmission signal received from the other base station apparatus according to a timing reported by a MAC processing apparatus having a function of controlling the timing for the processing unit to process the transmission signal from the other base station apparatus, and the processing unit generates report information used for controlling the timing based on the transmission signal from the other base station apparatus, and reports the report information to the MAC processing apparatus.

(19) In accordance with still another aspect of the present invention, there is provided a MAC processing apparatus that performs a processing related to a communicational MAC layer, including a control unit that controls a timing at which a transmission signal from other base station apparatus is processed in a PHY processing apparatus having a function of processing the transmission signal from the other base station apparatus, and that reports the timing to the PHY processing apparatus, wherein the control unit acquires, from the PHY processing apparatus, report information generated by the PHY processing apparatus based on the transmission signal from the other base station apparatus, and the control unit controls the timing based on the report information.

DESCRIPTION OF EMBODIMENTS

In the following, with reference to the accompanying drawings, a description will be given of preferred embodiments of the present invention.

[1. Structure of Communication System]

Figure 1:
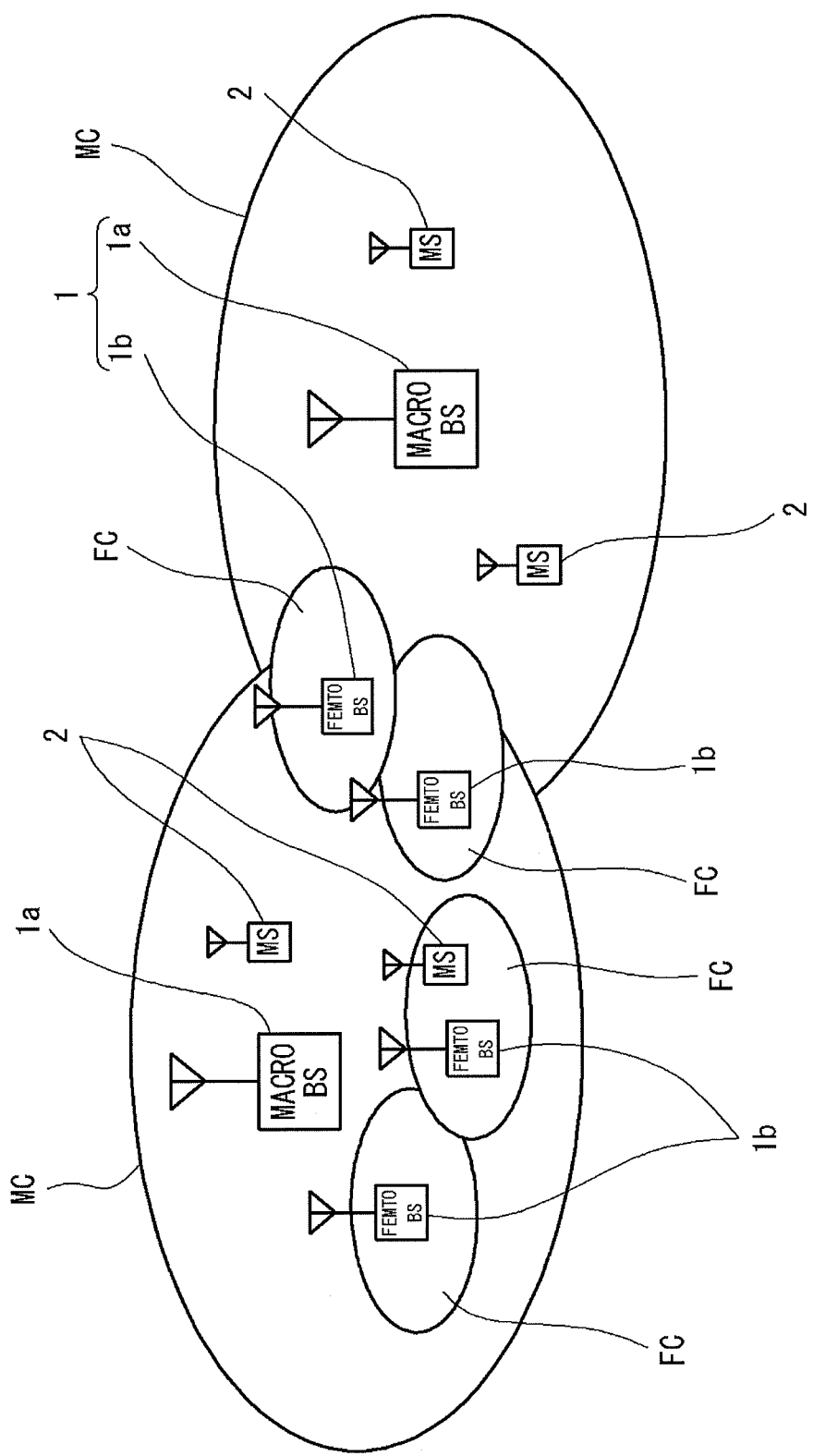
FIG. 1 is a schematic diagram showing the structure of a wireless communication system according to one embodiment of the present invention.

FIG. 1 is a schematic diagram showing the structure of a wireless communication system according to one embodiment of the present invention.

The wireless communication system includes a plurality of base station apparatuses 1 and a plurality of terminal devices 2 (mobile terminals; Mobile Stations) capable of establishing wireless communication with the base station apparatuses 1.

A plurality of base station apparatuses 1 include a plurality of macro base station apparatuses (Macro Base Stations) 1a that each form a communication area (macrocell) MC of several kilometers, for example, and a plurality of femto base station apparatuses (Femto Base Stations) 1b that are installed in the macrocells MC and that each form a relatively small femtocell FC of about several tens of meters.

Each of the macro base station apparatuses 1a (hereinafter also referred to as the macro BS 1a) can establish wireless communication with the terminal devices 2 that are present in a macrocell MC of the macro base station apparatus 1a.

Further, each of the femto base station apparatuses 1b (hereinafter also referred to as the femto BS 1b) is disposed at a location where the radio wave of the macro BS 1a is not easily received, e.g., indoors, and forms the femtocell FC. Each femto BS 1b is capable of establishing wireless communication with the terminal devices 2 (hereinafter also referred to as the MS 2) that are present in a femtocell FC that is formed by the femto BS 1b. The present system makes it possible to provide the service of ample throughput to the MS 2 even in a place where the radio wave of the macro BS 1a is difficult to be received, by installing the femto BS 1b that forms a relatively small femtocell FC at such a place.

In the wireless communication system described above, after a macro BS 1a is installed, a femto BS 1b is installed in the macrocell MC formed by the macro BS 1a, to form a femtocell FC in the macrocell MC. Accordingly, the femto BS 1b may suffer from interference or the like in relation to the macro BS 1a.

Accordingly, the femto BS 1b has a function of monitoring (measuring) the transmission status such as the transmission power or the operating frequency of other base station apparatus such as the macro BS 1a or other femto BS 1b other than itself. Further, the femto BS 1b has a function of adjusting the transmission conditions such as the transmission power, the operating frequency and the like based on the monitoring (measurement) result, so as not to affect the communication in the macrocell MC. Thanks to these functions, the femto BS 1b can form a femtocell FC in a macrocell MC without affecting the communication of the macrocell MC.

Further, the communication system according to the present embodiment performs inter-base-station synchronization, in which communication frame timings of a plurality of base station apparatuses including the macro BS 1a and the femto BS 1b are synchronized with each other.

The inter-base-station synchronization is executed by "over-the-air synchronization", in which a base station apparatus serving as the master (synchronization source) transmits a signal to MS 2 that is present in a cell of the base station apparatus, and other base station apparatus receives the signal, whereby synchronization is achieved.

The base station apparatus to be the master may achieve the over-the-air synchronization with still another base station apparatus. Alternatively, it may determine the frame timing by any method other than the over-the-air synchronization, e.g., by determining the frame timing autonomously by GPS signals.

It is to be noted that, while a macro BS 1a can refer to other macro BS 1a as the master, it cannot refer to any femto BS 1b as the master. A femto BS 1b can refer to any macro BS 1a as the master, or it can refer to other femto BS 1b as the master.

The wireless communication system according to the present embodiment is, for example, a mobile phone-use system to which LTE (Long Term Evolution) is applied. Between the base station apparatuses and the terminal devices, communication that adheres to LTE is established. With the LTE, the frequency-division duplex (FDD) scheme can be adopted. The following description will be given based on that the FDD scheme is adopted in the present communication system. It is to be noted that, the communication system is not limited to LTE. Further, it is not limited to the FDD scheme, and it may be the TDD (Time-Division Duplex) scheme, for example.

[2. Frame Structure of LTE]

In the FDD scheme that can be adopted in LTE to which the communication system according to the present embodiment adheres, by allocating different operating frequencies to uplink signals (transmission signals from the terminal device to the base station apparatus) and downlink signals (transmission signals from the base station apparatus to the terminal device), uplink communication and downlink communication are simultaneously established.

Figure 2:
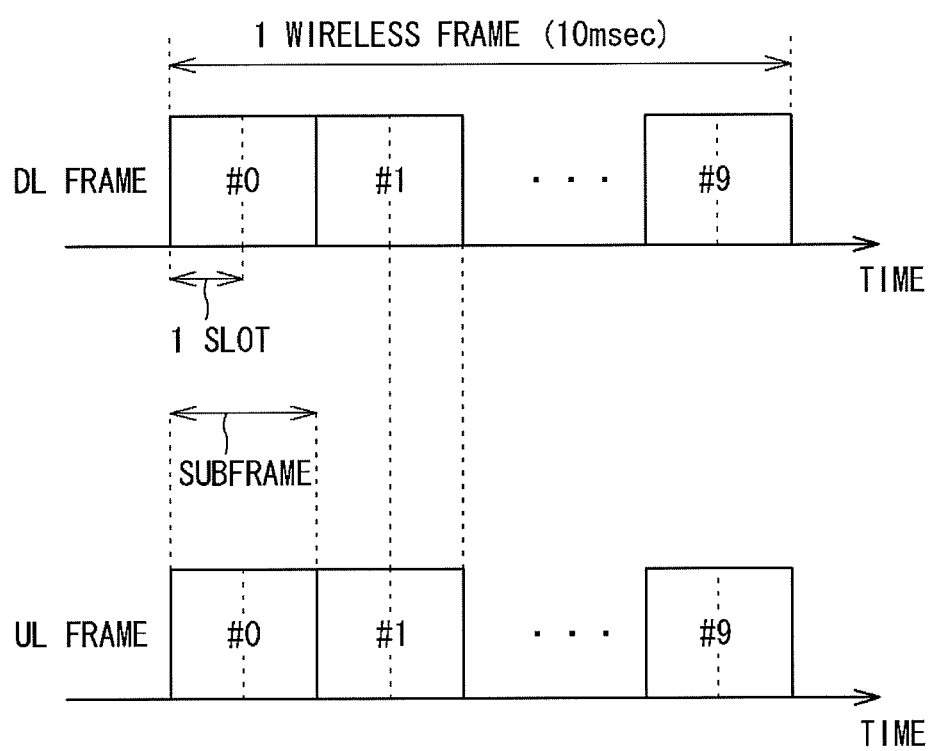
FIG. 2 is a diagram showing the structure of uplink and downlink communication frames in LTE.

FIG. 2 is a diagram showing the structure of the uplink and downlink communication frames in LTE. Each of a downlink frame (DL frame) and an uplink frame (UL frame) in LTE has a time length of 10 milliseconds and structured with ten subframes, namely #0 to #9 subframes. The DL frame and the UL frame are arranged in the time axis direction having their respective timings coincide with each other.

Figure 3:
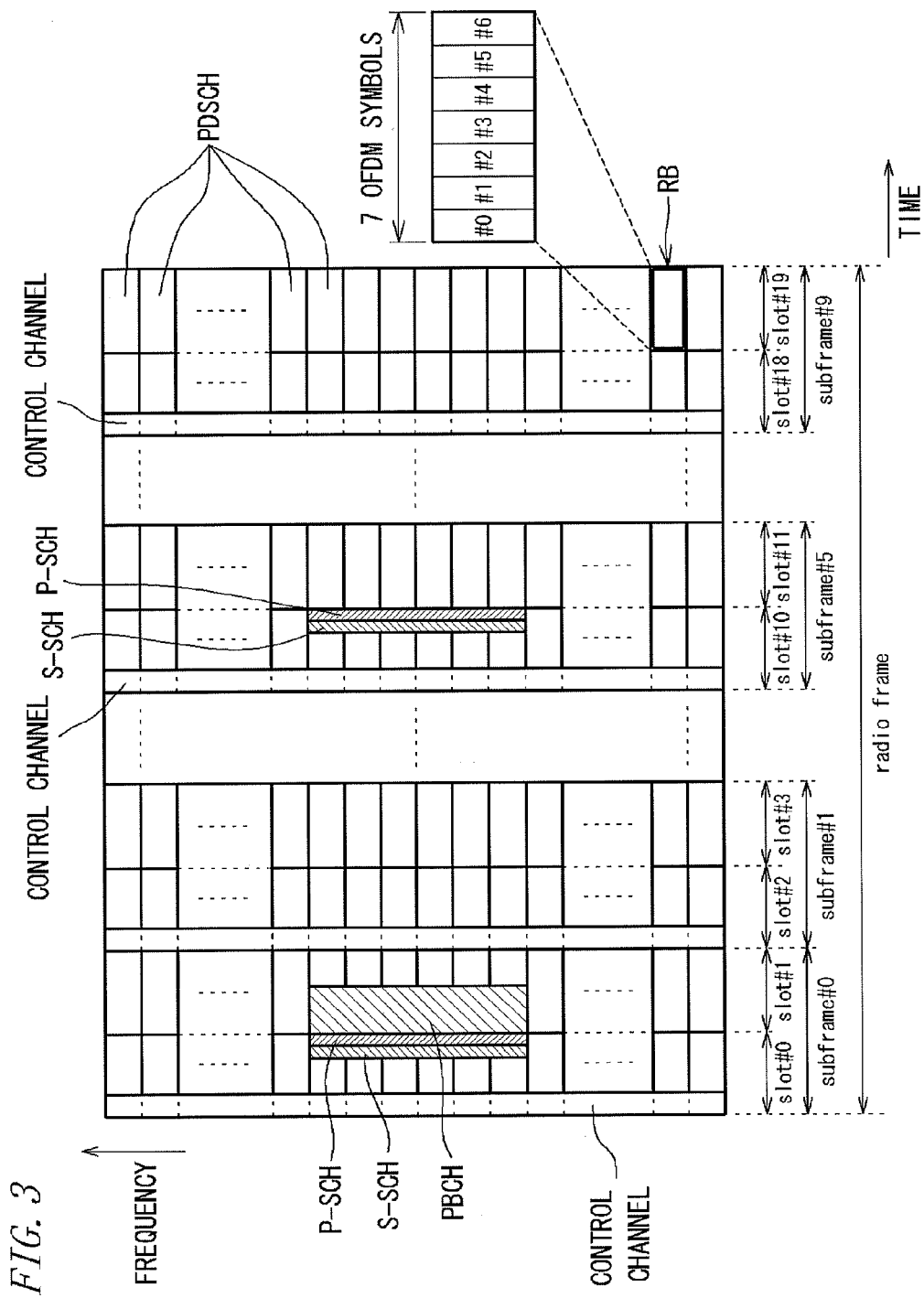
FIG. 3 is a diagram showing the detailed structure of the DL frame.

FIG. 3 is a diagram showing a detailed structure of the DL frame. In the drawing, the vertical axis direction represents frequency, and the horizontal axis direction represents time.

The subframes structuring the DL frame are each structured with two slots (e.g., slots #0 and #1). Further, one slot is structured with seven OFDM symbols (#0 to #6) (in the case of Normal Cyclic Prefix).

Further, in the drawing, the resource blocks (RB: Resource Block), each of which are the basic unit in data transmission, are set by 12 subcarriers in the frequency axis direction and 7 OFDM symbols in the time axis direction (1 slot). Accordingly, for example, in a case where the frequency band width of the DL frame is set to 5 MHz, 300 subcarriers are arranged. Therefore, 25 pieces of the resource blocks are arranged in the frequency axis direction.

As shown in FIG. 3, at the beginning of each subframe, control channels for a base station apparatus to transmit the necessary information for downlink communication to a terminal device are allocated. The control channels are allocated by the slot symbols #0 to #2 (three symbols at the maximum) that are positioned on the beginning side in each subframe. Each control channel stores therein DL control information, resource allocaiton information of the subframe, reception success report (ACK: Acknowledgement) and reception failure report (NACK: Negative Acknowledgement) by hybrid automatic repeat request (HARQ: Hybrid Automatic Repeat Request) and the like.

Further, in the DL frame, to the 1st subframe #0, a broadcast channel (PBCH: Physical Broadcast Channel) for reporting the system bandwidth or the like through broadcast transmission to the terminal device is allocated. The broadcast channel is arranged by four-symbol width at the position of the slot symbols #0 to #3 on the rear side in the 1st subframe #0 in the time axis direction, and is arranged by six-resource-block width (72 subcarriers) at the central position in the DL frame bandwidth in the frequency axis direction. The broadcast channel is structured such that, by identical information being transmitted over four frames, update is carried out every 40 milliseconds.

The broadcast channel stores therein main system information such as the communication bandwidth, the number of transmission antennas, the structure of the control information and the like.

Further, of the ten subframes structuring the DL frame, to each of the 0th (#0) and 6th (#5) subframes, a primary synchronization signal and a secondary synchronization signal (P-SCH: Primary Synchronizaiton Channel, S-SCH: Secondary Synchronizaiton Channel) which are signals for identifying the base station apparatus and the cell are allocated.

The primary synchronization signal is arranged by one-symbol width at the position of the symbol #6 being the last OFDM symbol in the 1st (#0) slot in each of the subframe #0 and the subframe #5 in the time axis direction, and is arranged by six-resource-block width (72 subcarriers) at the central position in the DL frame bandwidth in the frequency axis direction. The primary synchronization signal is information for a terminal device to identify a plurality of (three) sectors which are the result of a cell of the base station apparatus being divided, and is defined in three patterns.

The secondary synchronization signal is arranged by one symbol width at the position of the symbol #5 being the second OFDM symbol from the last slot #0 in each of the subframe #0 and the subframe #5 in the time axis direction, and is arranged by six-resource-block width (72 subcarriers) at the central position in the DL frame bandwidth in the frequency axis direction. The secondary synchronization signal is information for a terminal device to identify each of communication areas (cells) of a plurality of base station apparatuses, and is defined in 168 patterns.

Combinations of the primary synchronization signal and the secondary synchronization signal provide 504 types (168×3) of patterns being defined. A terminal device acquires the primary synchronization signal and the secondary synchronization signal transmitted from a base station apparatus, whereby it becomes possible for the terminal device to recognize in which sector of which base station apparatus the terminal itself is present.

A plurality of patterns that the primary synchronization signal and the secondary synchronization signal can form are predetermined by communication standards, and are known by each base station apparatus and each terminal device. That is, the primary synchronization signal and the secondary synchronization signal are each a known signal that can form a plurality of patterns.

The primary synchronization signal and the secondary synchronization signal are each used not only for a case where a terminal device synchronizes with a base station apparatus, but also as a signal for the inter-base-station synchronization in which the communication timing and/or frequency is/are synchronized between base station apparatuses. This will be described later.

The resource blocks in other region to which the aforementioned channels are not allocated (the region with no hatching in the drawing) are each used as a DL shared communication channel (PDSCH: Physical Downlink Shared Channel) for storing user data and the like. The DL shared communication channel is an area shared for communications among a plurality of terminal devices, and not only user data but also control information for each terminal device and the like are stored.

The allocation of the user data stored in the DL shared communication channel is defined by the resource allocation information in the control channel allocated to the beginning of each subframe. Based on the resource allocation information, a terminal device can determine whether or not data for the terminal is stored in the subframe.

[3. Structure of Femto Base Station Apparatus]

Figure 4:
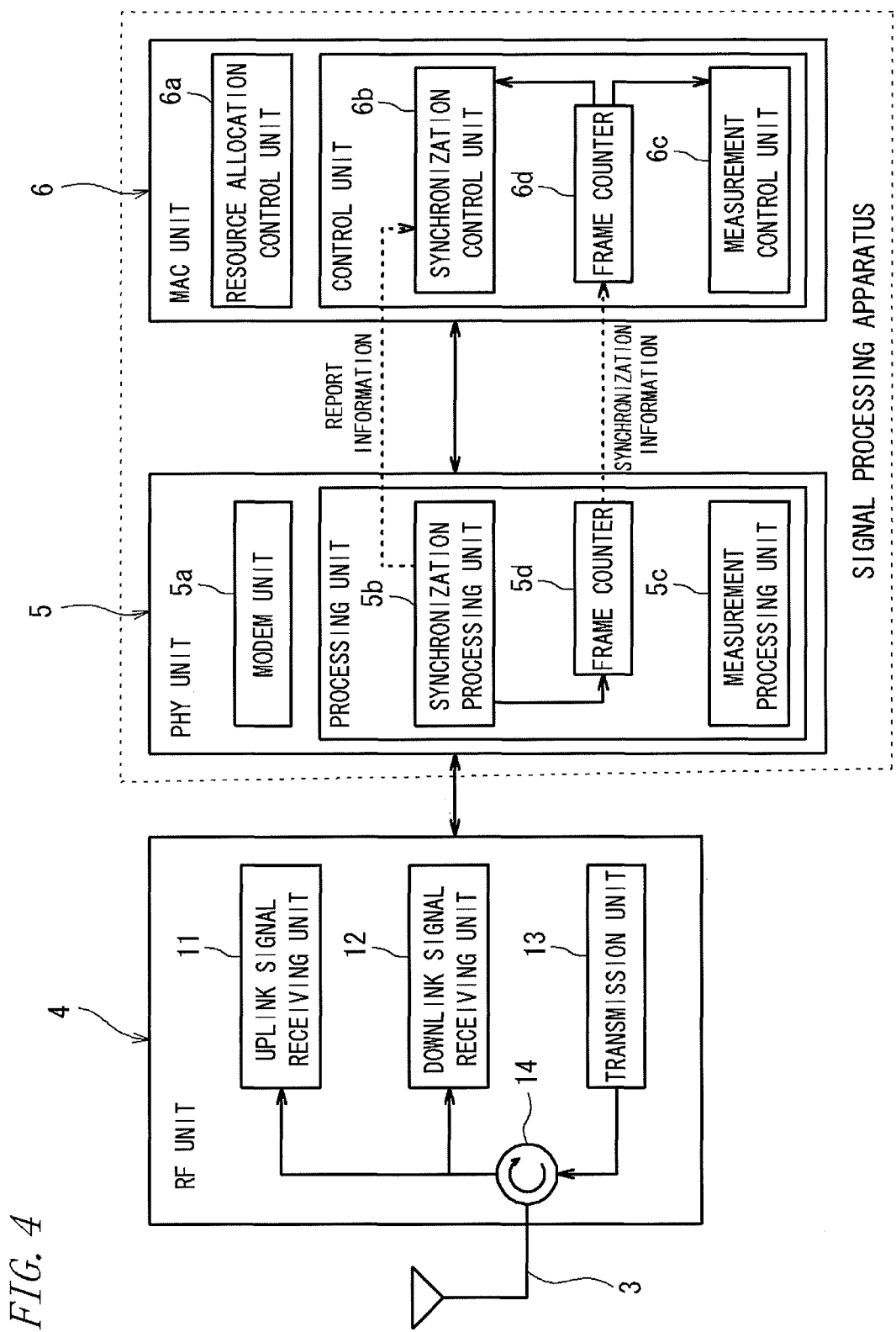
FIG. 4 is a block diagram showing the structure of a femto base station apparatus.

FIG. 4 is a block diagram showing the structure of the femto base station apparatus shown in FIG. 1. It is to be noted that, while the structure of the femto BS 1b is described herein, the structure of the macro BS 1a is substantially similar to that of the femto BS 1b.

The femto BS 1b1 includes an antenna 3, an RF unit (analog signal processing circuit) 4 to which the antenna 3 is connected, and a signal processing apparatus (digital signal processing apparatus) connected to the RF unit.

The signal processing apparatus includes a PHY unit (PHY processing apparatus) 5 that performs a process related to the communicational PHY layer, and a MAC unit (MAC processing apparatus) 6 that performs a process related to the communicational MAC layer. It is to be noted that, while it is not shown, the signal processing apparatus is provided also with a function of performing a process of a higher level layer than the MAC layer.

The PHY unit 5 performs not only signal processes (modulation and demodulation processes) for transmission and reception signals exchanged with the RF unit 4, but also a process as to the inter-base-station synchronization, the measurement and the like.

The MAC unit 6 performs a process such as resource allocation as to various data stored in the transmission and reception signals, and exerts control as to adjustment of the transmission condition based on the inter-base-station synchronization, the measurement and the like.

It is to be noted that the PHY unit is structured with a DSP (Digital Signal Processor), and processes are performed by hardware logic. The MAC unit 6 includes a CPU and a memory, and processes are performed by software logic by computer programs.

[3.1 RF Unit]

Figure 5:
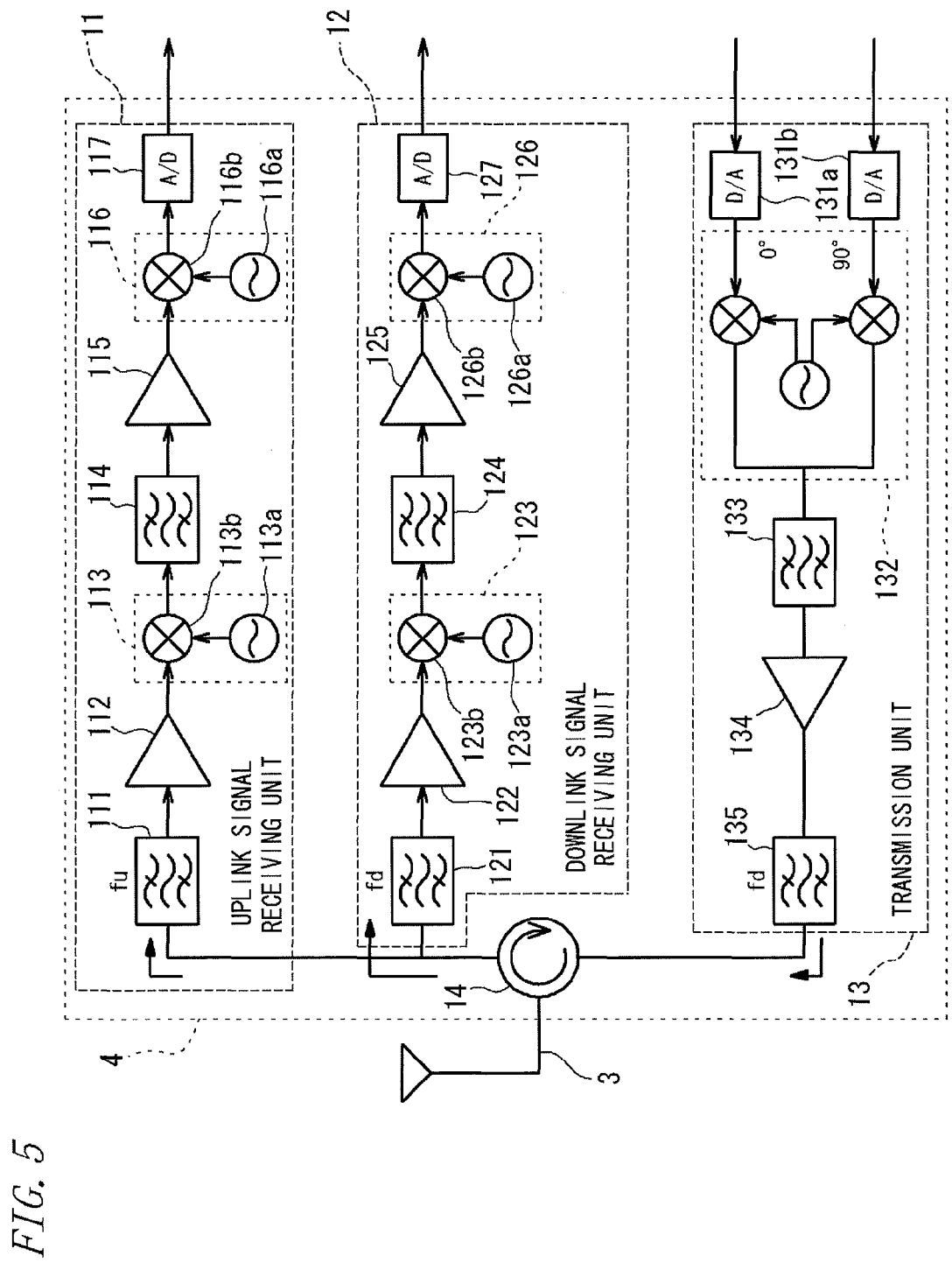
FIG. 5 is a block diagram showing details of an RF unit.

FIG. 5 is a block diagram showing details of the RF unit 4. The RF unit 4 includes an uplink signal receiving unit 11, a downlink signal receiving unit 12, and a transmission unit 13. The uplink signal receiving unit 11 is for receiving uplink signals from each terminal device 2, and the downlink signal receiving unit 12 is for receiving downlink signals from other macro BS 1a or other femto BS. The transmission unit 13 is for transmitting downlink signals to each terminal device 2.

Further, the RF unit 4 includes a circulator 14. The circulator 14 is for providing reception signals from the antenna 3 to the uplink signal receiving unit 11 side and the downlink signal receiving unit 12, and for providing transmission signals output from the transmission unit 13 to the antenna 3 side. The circulator 14 and a fourth filter 135 of the transmission unit 13 prevent reception signals from antenna 3 from being provided to the transmission unit 13 side.

Further, the circulator 14 and a first filter 111 of the uplink signal receiving unit prevent transmission signals output from the transmission unit 13 being provided to the uplink receiving unit 11. Further, the circulator 14 and a fifth filter 121 prevent transmission signals output from the transmission unit 13 from being provided to the uplink signal receiving unit 12.

The uplink signal receiving unit 11 is structured as a super-heterodyne receiver, and is structured to perform IF (intermediate frequency) sampling. More specifically, the uplink signal receiving unit 11 includes the first filter 111, a first amplifier 112, a first frequency converter unit 113, a second filter 114, a second amplifier 115, a second frequency converter unit 116, and an A/D converter unit 117.

The first filter 111 is for passing only an uplink signal from each terminal device 2, and is structured with a band-pass filter that passes only a frequency $f_u$ of the uplink signal. The reception signal that has passed the first filter 111 is amplified by the first amplifier (high frequency amplifier) 112, and is converted by the first frequency converter unit 113 from the frequency $f_u$ into a first intermediate frequency. It is to be noted that, the first frequency converter unit 113 is structured with an oscillator 113a and a mixer 113b.

The output of the first frequency converter unit 113 passes the second filter 114 that passes only the first intermediate frequency, and is again amplified by the second amplifier (intermediate frequency amplifier) 115. The output of the second amplifier 115 is converted by the second frequency converter unit 116 from the first intermediate frequency into the second intermediate frequency, and further is converted by the A/D converter unit 117 into a digital signal. It is to be noted that the second frequency converter unit 116 is also structured with an oscillator 116a and a mixer 116b.

The output of the A/D converter unit 117 (the output of the first receiving unit 11) is provided to a modem unit 5a of the PHY unit 5, and the reception signal from the terminal device 2 is subjected to a demodulation process.

As described above, the uplink signal receiving unit 11 is a receiving unit that is structured to be suitable for the uplink signal frequency $f_u$ for receiving an uplink signal from each terminal device, and is an intrinsically required receiving unit as a base station apparatus.

Further, the transmission unit 13 is structured to receive an in-phase signal I and a quadrature signal Q output from the PHY unit 5, and to cause the antenna 3 to transmit a signal. The transmission unit 13 is structured as a direct conversion transmitter. The transmission unit 13 includes D/A converter units 131a and 131b, an orthogonal modulator 132, a third filter 133, a third amplifier (high power amplifier; HPA) 134, and the fourth filter 135.

The D/A converter units 131a and 131b perform D/A conversion for each of the in-phase signal I and the quadrature signal Q provided from the modem unit 5a of the PHY unit 5. The output of the D/A converter units 131a and 131b is provided to the orthogonal modulator 132. The orthogonal modulator 132 generates a transmission signal whose carrier wave frequency is $f_d$ (downlink signal frequency).

The output of the orthogonal modulator 132 passes through the third filter 133 that passes only the frequency $f_d$, and is amplified by the third amplifier 134. Further, it passes through the fourth filter 135 that passes only the frequency $f_d$ and is transmitted from the antenna 3, to be a downlink signal to the terminal device.

While the uplink signal receiving unit 11 and the transmission unit 13 described above are the necessary functions for establishing primal communication with terminal devices, the base station apparatus 1 of the present embodiment further includes the downlink signal receiving unit 12. The downlink signal receiving unit 12 is for receiving downlink signals transmitted by other base station apparatuses.

In the present embodiment, a downlink signal from the other base station apparatus received by the downlink signal receiving unit 12 is used for the inter-base-station synchronization process, and measurement of the transmission status of the transmission power of the other base station apparatus and the like.

Here, the frequency of the downlink signal transmitted by the other base station apparatus is $f_d$, and is different from the frequency $f_u$ of the uplink signal. Therefore, a normal base station apparatus that includes only the uplink signal processing unit 11 cannot receive downlink signals transmitted by other base station apparatuses.

That is, being different from the TDD scheme, in the FDD scheme, since uplink signals and downlink signals are present at the same time on the transmission path, it is designed such that the uplink signal receiving unit 11 passes only signals of the uplink signal frequency $f_u$, and does not pass signals of the downlink signal frequency $f_d$. Specifically, since the uplink signal receiving unit 11 is provided with the first filter 111 that passes only the signals of the uplink signal frequency $f_u$ and the second filter 114 that passes only the first intermediate frequency converted from the frequency $f_u$, even when a signal of a frequency other than frequency $f_u$ (i.e., the downlink signal frequency $f_d$) is provided to the first receiving unit 11, the signal cannot pass the uplink signal receiving unit 11.

Further, thanks to the filters 111 and 114 provided inside the uplink signal receiving unit 11, the uplink signal receiving unit 11 is suitable for receiving a signal of the uplink signal frequency $f_u$, and signals of other frequencies (in particular, the downlink signals) cannot be received.

Therefore, the RF unit 4 of the present embodiment is provided with the downlink signal receiving unit 12 for receiving the downlink signals of the frequency $f_d$ transmitted by other base station apparatuses, separately from the uplink signal receiving unit 11.

The downlink signal receiving unit 12 includes the fifth filter 121, a fourth amplifier (high frequency amplifier) 122, a third frequency converter unit 123, a sixth filter 124, a fifth amplifier (intermediate frequency amplifier) 125, a fourth frequency converter unit 126, and an A/D converter unit 127.

The fifth filter 121 is for passing only the downlink signals from other base station apparatuses, and is structured with a band-pass filter that passes only the downlink signal frequency $f_d$. A reception signal having passed through the fifth filter 121 is amplified by the fourth amplifier (high frequency amplifier) 122, and the output of the fourth amplifier 122 is converted from the downlink signal frequency $f_d$ into the first intermediate frequency by the third frequency converter unit 123. It is to be noted that the third frequency converter unit 123 is structured with an oscillator 123a and a mixer 123b.

The output of the third frequency converter unit 123 passes through the sixth filter 124 that passes only the first intermediate frequency output from the third frequency converter unit 123, and is again amplified by the fifth amplifier (intermediate frequency amplifier) 125. The output of the fifth amplifier 125 is converted from the first intermediate frequency into the second intermediate frequency by the fourth frequency converter unit 126, and further converted into a digital signal by the A/D converter unit 127. It is to be noted that the fourth frequency converter unit 126 is also structured with an oscillator 126a and a mixer 126b.

The signal output from the A/D converter unit 127 is provided to a synchronization processing unit 5b and a measurement processing unit 5c included in the PHY unit 5, both of which will be described later.

It is to be noted that the uplink signal receiving unit 11 and the downlink signal receiving unit 11 may each be structured as a direct conversion receiver.

Further, it is preferable that, as to each of the downlink signal receiving unit 11 and the transmission unit 13, uplink and downlink symmetry in the downlink signal receiving unit 11 and the transmission unit 13 is secured for each of the antennas by antenna calibration. The antenna calibration can be performed by providing a not-shown gain-phase adjuster to the downlink signal receiving unit 11 and/or transmission unit 13.

[3.2 PHY Unit]

The PHY unit 5 has a function for processing transmission and reception signals exchanged with the RF unit 4. The PHY unit 5 includes the modem unit 5a that modulates various transmission data provided by the MAC unit 6 into transmission signals, and that demodulates reception signals provided by the RF unit 4 into reception data. In the modem unit 5a, based on a synchronization error (timing offset, frequency offset) calculated by the synchronization processing unit 5b whose description will follow, modulation and demodulation processes are performed in a state where the synchronization error is corrected.

Further, the PHY unit 5 includes, as a processing unit for processing downlink signals transmitted from other base station apparatuses, the synchronization processing unit 5b for performing the synchronization process, i.e., for achieving the inter-base-station synchronization with the other base station apparatus, and the measurement unit 5c for performing measurement. Further, the PHY unit includes a frame counter 5d for determining a transmission timing for each subframe as to a transmission signal provided to the RF unit 4.

In the following, a description will be given of the structure of the synchronization processing unit 5b.

[3.2.1 As to Synchronization Processing Unit]

Figure 6:
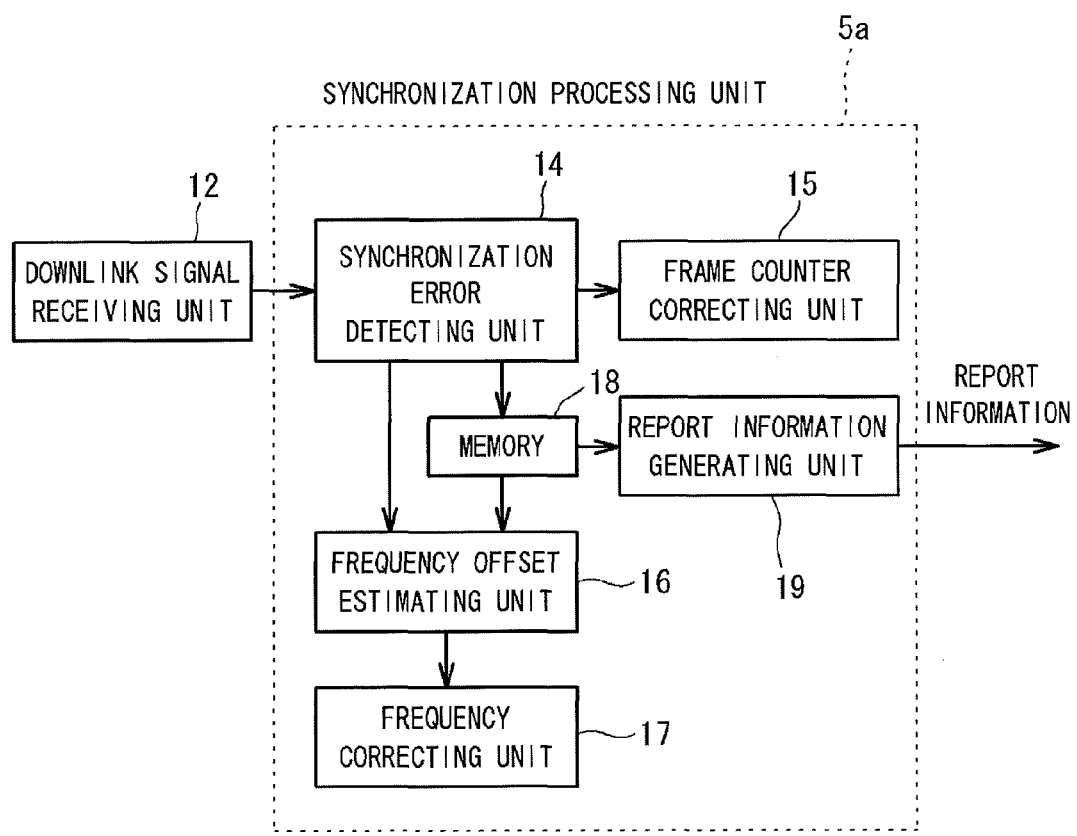
FIG. 6 is a block diagram showing the structure of a synchronization processing unit for performing a synchronization process, which is an inter-base-station synchronization with other base station apparatus.

FIG. 6 is a block diagram showing the structure of the synchronization processing unit 5b for performing the synchronization process, i.e., for achieving the inter-base-station synchronization with other base station apparatus.

The inter-base-station synchronization may be achieved by the base station apparatuses each including a GPS receiver, such that they can synchronize with each other based on GPS signals. Alternatively, synchronization may be achieved by connecting among the base stations with wires. However, the present embodiment adopts the inter-base-station synchronization of "the over-the-air synchronization" in which synchronization is achieved based on wireless signals (downlink signals).

That is, the synchronization processing unit 5b acquires a downlink signal of other base station apparatus received by the downlink signal receiving unit 12, and based on the primary synchronization signal (P-SCH) and the secondary synchronization signal (S-SCH) included in the frame of the downlink signal, the synchronization processing unit 5b performs a process for synchronizing the communication timing and the communication frequency of its own base station apparatus 1 with those of the other base station apparatus.

Further, the synchronization processing unit 5b performs the synchronization process based on information for specifying a timing (section) for performing the synchronization process, the timing being provided from the MAC unit 6. The synchronization processing unit 5a suspends transmission of transmission signals by the transmission unit 13 to terminal devices at the aforementioned timing (section). While the transmission of transmission signals is suspended, the synchronization processing unit 5b causes the downlink signal receiving unit 12 to receive a downlink signal of the other base station apparatus, and thus the received downlink signal is acquired. It is to be noted that, not only the suspension of transmission of transmission signals, but also suspension of reception of uplink signals from terminal devices may be performed.

The synchronization processing unit 5b includes a synchronization error detecting unit 14, a frame counter correcting unit 15, a frequency offset estimating unit 16, a frequency correcting unit 17, a memory 18, and a report information generating unit 19. The synchronization processing unit 5b synchronizes frame transmission timings, and corrects carrier frequencies. Further, the synchronization processing unit 5b generates report information that is reported to the MAC unit 6 (details thereof will be described later).

The synchronization error detecting unit 14 uses a known signal included in the downlink signal to thereby detect the frame transmission timing (the processing timing of the communication frame) of the other base station apparatus, and detects an error (a frame synchronization error; a transmission timing offset) with reference to the frame transmission timing of the base station apparatus 1 itself.

It is to be noted that, detection of the transmission timing can be performed by detecting the timing of the primary synchronization signal and the secondary synchronization signal, each of which is a known signal (waveform is also known) at a prescribed position in the frame of the received downlink signal.

Further, the synchronization error detecting unit 14 provides the detected frame synchronization error not only to the frame counter correcting unit 15 but also to the memory 18 every time it is detected. The memory 18 accumulates the detected frame synchronization errors.

The frame synchronization error detected by the synchronization error detecting unit 14 is provided to the frame counter correcting unit 15. The frame counter correcting unit 15 corrects the frame counter value that determines the frame transmission timing in accordance with the detected frame synchronization error. Thus, the self femto BS 1b can synchronize with the other base station apparatus.

The frequency offset estimating unit 16 estimates the difference (clock frequency error) between the clock frequency of the built-in clock generator (not shown) that the base station apparatus on the reception side itself contains and the clock frequency of the built-in clock generator of the other base station apparatus on the transmission side based on the synchronization error detected by the detecting unit 14, and estimates a carrier frequency error (carrier frequency offset) from that clock frequency error.

The frequency offset estimating unit 16 estimates a clock error based on a frame synchronization error t1 detected in the previous over-the-air synchronization and a frame synchronization error t2 detected in the present over-the-air synchronization in the situation where the over-the-air synchronization is periodically executed. It is to be noted that, the previous frame synchronization error t1 can be acquired from the memory 18.

For example, it is assumed that, in a case where the carrier frequency is 2.6 [GHz], T1 is detected as the frame synchronization error at the previous over-the-air synchronization timing (synchronization timing=t1) and the timing is corrected by T1. The corrected synchronization error (timing offset) is 0 [msec]. Also, it is assumed that, a synchronization error (timing offset) is detected again at the timing (synchronization timing=t2) at the present over-the-air synchronization, which is T=10 seconds after the previous synchronization, and that the synchronization error (timing offset) is T2=0.1 [msec].

Here, the synchronization error (timing offset) of 0.1 [msec] generated during the 10 seconds is an accumulation value of errors between the clock period of the other base station apparatus and the clock period of the self base station apparatus.

That is, the synchronization error (timing offset) and the clock period establish the following equation:

The clock period of the synchronization source base station: the clock period of the synchronization target base station=T:(T+T2)=10: (10+0.0001)

Since the clock frequency is the reciprocal of the clock period, the following is established:

(the clock frequency of the synchronization source base station−the clock frequency of the synchronization target base station)

=the clock frequency of the synchronization source base station×T2/(T+T2)

≈the clock frequency of the synchronization source base station×0.00001

Accordingly, in this case, there exists the error of 0.00001=10 [ppm] between the clock frequency of the other base station apparatus on the transmission side and the clock frequency of the self base station apparatus on the reception side. The frequency offset estimating unit 16 estimates the clock frequency error in the foregoing manner.

Since the carrier frequency and the synchronization error (timing offset) are shifted in the same manner, a mismatch for 10 [ppm], i.e., 2.6 [GHz]×1×$10^{-5}$=26 [kHz] occurs also in the carrier frequency. In this manner, the frequency offset estimating unit 16 can also estimate the carrier frequency error (carrier frequency offset) from the clock frequency error.

The carrier frequency error estimated by the frequency offset estimating unit 16 is provided to the frequency correcting unit 17.

The frequency correcting unit 17 corrects the carrier frequency based on this carrier frequency error. It is to be noted that the correction of the carrier frequency is not limited to the carrier frequency of an uplink signal, and the carrier frequency of a downlink signal can also be corrected.

Next, a description will be given of the function of the measurement unit 5c.

[3.2.2 As to Measurement Unit]

The measurement unit 5c is a function unit for performing measurement of the transmission status of a downlink signal, such as the transmission power and the operating frequency of other base station apparatus. The measurement unit 5c acquires a downlink signal of the other base station apparatus received by the downlink signal receiving unit 12, and observes the reception power in the DL shared communication channel (PDSC) of the downlink signal frame over time, and outputs the observation result to the MAC unit 6.

The measurement unit 5c performs measurement based on information for specifying the timing (section) for performing the measurement, the information being provided from the MAC unit 6. The measurement unit 5c suspends transmission of transmission signals by the transmission unit 13 at that timing (section). While the transmission of transmission signals is suspended, measurement unit 5c causes the downlink signal receiving unit 12 to receive a downlink signal of the other base station apparatus, and thus the received downlink signal is acquired. It is to be noted that, not only the suspension of transmission of transmission signals, but also suspension of reception of uplink signals from terminal devices may be performed.

In accordance with the control signal from the MAC unit 6, the measurement unit 5c suspends transmission of its own transmission signals for the section corresponding to a prescribed number of subframes, and acquires a downlink signal of the other base station apparatus from the downlink signal receiving unit 12 during that period. The measurement unit 5c obtains the average value (power average value) of reception power for each resource block frequency width.

For example, in a case where the frequency band width of the DL frame is set to 5 MHz, as described above, since 25 resource blocks are arranged in the frequency axis direction, the measurement unit 5c obtains a total of 25 power average values for the resource blocks, respectively.

When the power average values are obtained, the measurement unit 5c outputs the result to the MAC unit 6. The result of the measurement is used for the transmission power control, transmission frequency control, and resource allocation control for the purpose of preventing interference or the like.

[3.3 MAC Unit]

The MAC unit 6 has a resource allocation control unit 6a and a control unit that exerts control such as the inter-base-station synchronization, the measurement or the like. The control unit includes a synchronization control unit 6b that determines a timing of the inter-base-station synchronization by the synchronization processing unit 5a, a measurement control unit 6c that determines a timing of the measurement by the measurement unit 5c, and a frame counter 6d.

The synchronization control unit 6b has a function of adaptively control the timing of a synchronization process. Further, the synchronization control unit 6b reports information for specifying the determined timing for the synchronization process to the synchronization processing unit 5b of the PHY unit 5 and the resource allocation control unit 6a.

The measurement control unit 6c has a function of adaptively controlling the measurement timing. Further, the measurement control unit 6c reports information for specifying the determined measurement timing to the measurement unit 5c of the PHY unit 5 and the resource allocation control unit 6a.

The resource allocation control unit 6a has a function of allocating the shared communication channel (resource) in the communication frame to the terminal devices 2 (users).

Further, the resource allocation control unit 6a restricts the resource allocation such that allocation to the terminal devices 2 (users) is not performed as to a section where the terminal devices 2 cannot communicate due to a synchronization process and as to a section where the terminal devices 2 cannot communicate due to measurement.

[4. Synchronization of PHY Unit and MAC Unit]

As has been described, the frame counter 5d of the PHY unit 5 has its timing synchronized with the frame processing timing of the other base station apparatus serving as the synchronization source. The PHY unit 5 repeatedly resynchronizes with the other base station apparatus during communication, and corrects the synchronization error of the frame counter. Therefore, the period of counting up performed by the frame counter 5d in the PHY unit 5 is not necessarily constant, and varies.

Accordingly, with a simple structure in which, merely the frame counter 5d in the PHY unit 5 and the frame counter 6d in the MAC unit 6 are previously matched, both being set to count up using the same clock and the same period when the base station apparatus is activated, the counting operation of the frame counter 5d in the PHY unit 5 will vary by the synchronization error with the other base station apparatus with reference to the frame counter 6d in the MAC unit 6. As a result, the frame counters 5d and 6d will not match.

Accordingly, in the present embodiment, an inter PHY-MAC synchronization process is performed in which the frame counters 5d and 6d of the PHY unit 5 and the MAC unit 6, respectively, are synchronized, to synchronize the processing timing of the communication frame (subframe) in the PHY unit 5 and the processing timing of the communication frame (subframe) in the MAC unit 6.

Figure 7:
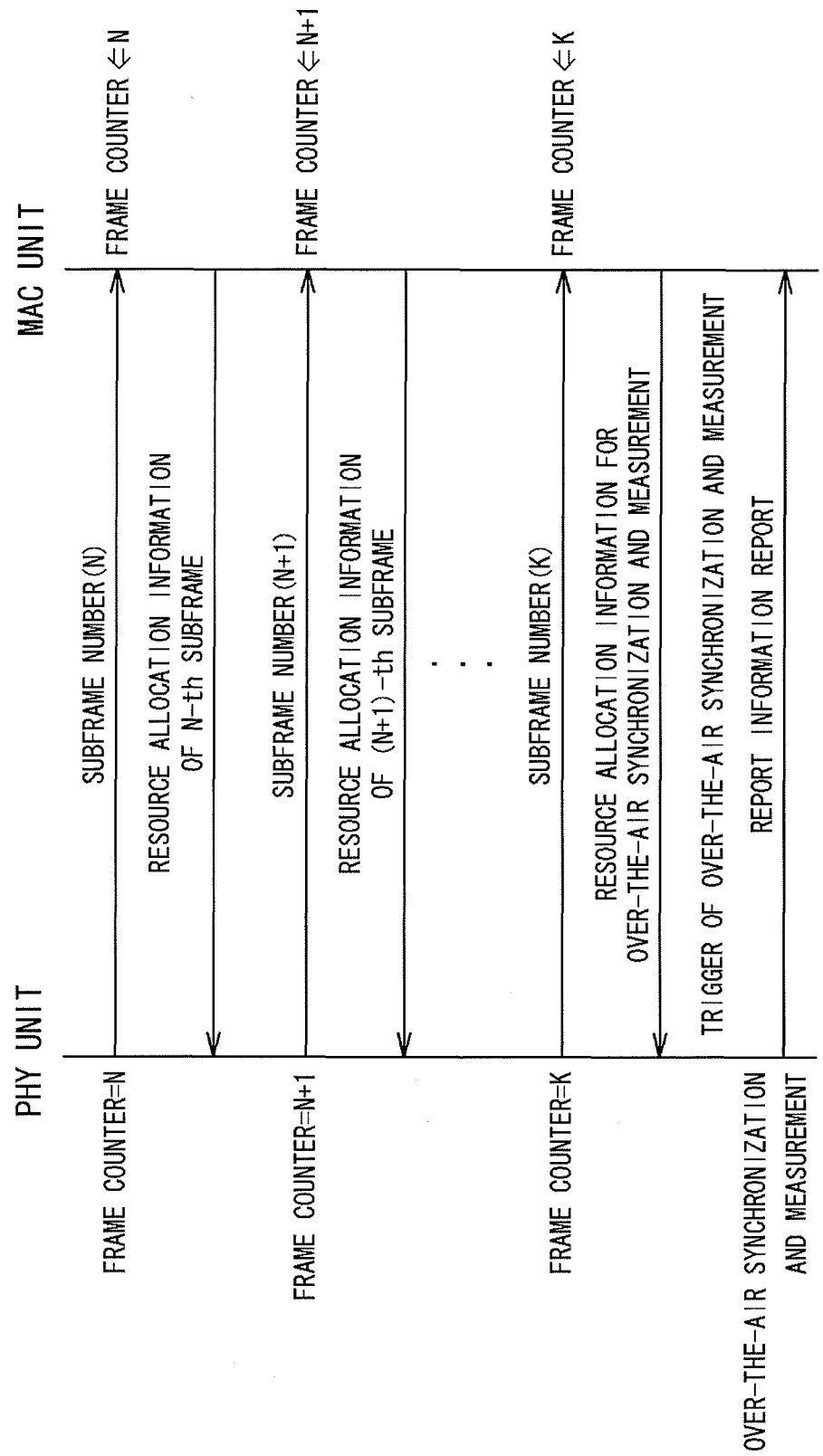
FIG. 7 shows a processing sequence between a PHY unit and a MAC unit.
Figure 8:
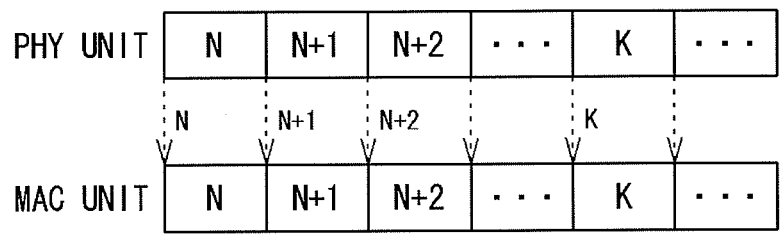
FIG. 8 is a diagram showing one exemplary manner of providing synchronization information from the PHY unit to the MAC unit.

FIGS. 7 and 8 show the inter PHY-MAC synchronization process. The inter PHY-MAC synchronization process is carried out in the following manner: the MAC unit 6 acquires synchronization information for synchronization of the frame counter 6d from the PHY unit 5, and matches the frame counter 6d of the MAC unit 6 with the frame counter 5d of the PHY unit. Accordingly, even when the operation timing of the frame counter 6d of the PHY unit 5 varies, the counters 5d and 6d can be synchronized with each other.

Specifically, in a case where the value of the frame counter 5d (i.e., the subframe number) of the PHY unit 5 is to be "N", the PHY unit 5 reports the value N as the synchronization information to the MAC unit 6. The MAC unit 6 sets the reported subframe number to its own frame counter 5d. This allows the counters 5d and 6d to match with each other. As shown in FIGS. 7 and 8, this report is performed every time the frame counter 5d of the PHY unit counts up N+1, N+2 . . . , and therefore, the counters 5d and 6d can always be matched with each other.

The resource allocation control unit 6a of the MAC unit 6 performs resource allocation to each of the downlink and uplink subframes, and the resource allocation information and the data transmitted by the allocated resource are provided from the MAC unit 6 to the PHY unit. Here, since the counters 5d and 6d match each other, when the subframe process is performed based on the counters 5d and 6d, the subframe processing timing of the PHY unit 5 and that of the MAC unit 6 match with each other, and the process by the MAC unit 6 will not precedes or lags behind the PHY unit 5. As a result, the timing at which the information is supplied from the PHY unit 5 to the MAC unit 6 is optimized.

It is to be noted that the synchronization information reported by the PHY unit 5 to the MAC unit 6 is not limited to the subframe number as described above. For example, it is not limited to the subframe number, and may be the frame number. Further, the synchronization information is not necessarily reported every subframe, but may be reported every one or several subframes. In a case where the frame number is reported as the synchronization information, synchronization of the subframe number is performed every 10 subframes (in the case of LTE). In a case where the synchronization information is reported every several subframes, synchronization of the subframe number is performed every that specific several subframes. In this case, though each one of the subframe number is counted up separately by the PHY unit 5 and the MAC unit 6, since it is a short time period of about 10 msec or less than that, there will be no great mismatch as to timing.

Figure 9:
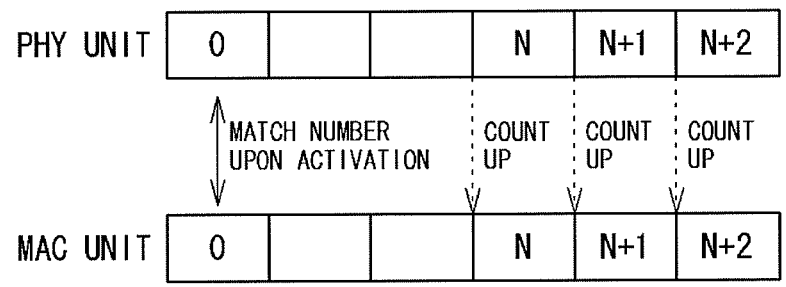
FIG. 9 is a diagram showing another exemplary manner of providing synchronization information from the PHY unit to the MAC unit.

Further, for example, as shown in FIG. 9, the following manner is also possible: the counters 5d and 6d of the PHY unit 5 and the MAC unit 6 are matched with each other at the activation of the base station apparatus, and count-up information for counting the frame counter up may be reported from the PHY unit 5 to the MAC unit 6 as the synchronization information. In this case, as compared to the case where the subframe number or the frame number is reported, the amount of information to be reported can be reduced.

The synchronization control unit 6b and the measurement control unit 6c of the MAC unit 6 determine the timing of performing the over-the-air synchronization process and the measurement process based on the synchronized frame counter 6d, and report, to the PHY unit 5, a trigger or the like for causing the PHY unit 5 to perform the over-the-air synchronization process and the measurement process. For example, in a case where it is determined that the over-the-air synchronization process or the measurement process is performed at the K-th subframe, when the synchronization control unit 6b or the measurement control unit 6c receives the subframe number=K from the PHY unit 5, the synchronization control unit 6b or the measurement control unit 6c determines that it is time to perform the over-the-air synchronization process or the measurement process, and reports, to the PHY unit 5, the trigger for causing the PHY unit 5 to perform the over-the-air synchronization process or the measurement process.

The synchronization processing unit 5b or the measurement processing unit 5c of the PHY unit that received the trigger performs the synchronization process or the measurement process using the transmission signal from the other base station apparatus received at the downlink signal receiving unit 12.

[5. Resource Allocation Control]

Figure 10:
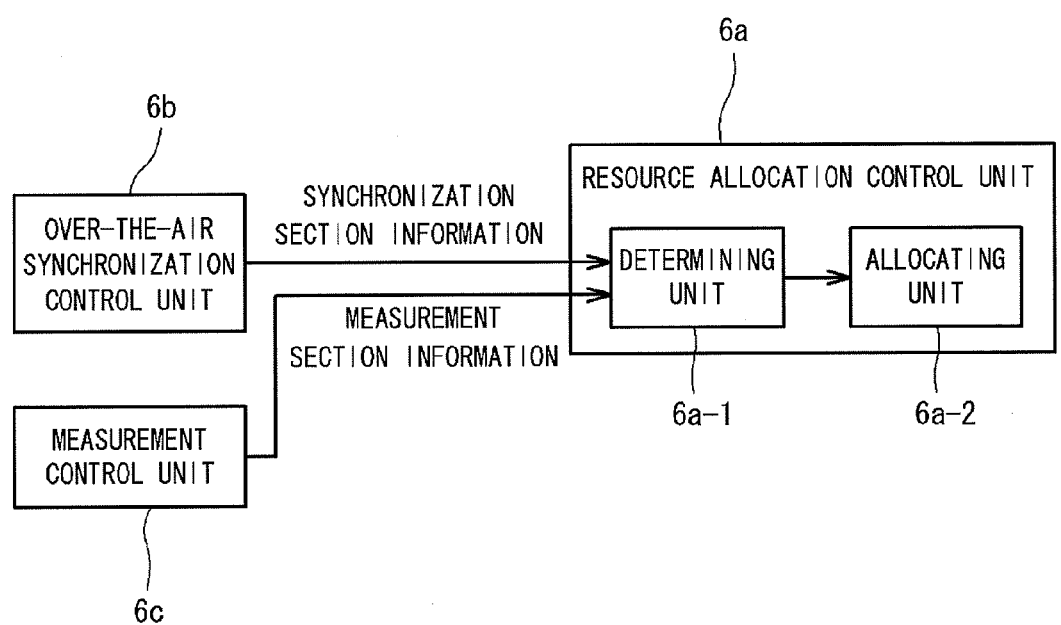
FIG. 10 is a block diagram showing the structure of a resource allocation unit.

As shown in FIG. 10, the resource allocation control unit 6a includes a determining unit 6a-1 that determines whether or not it is the over-the-air synchronization section or the measurement synchronization section, and an allocating unit 41 that allocates resource blocks in a shared communication channel shared by a plurality of user terminals 2 to the user terminals 2b.

Figure 11:
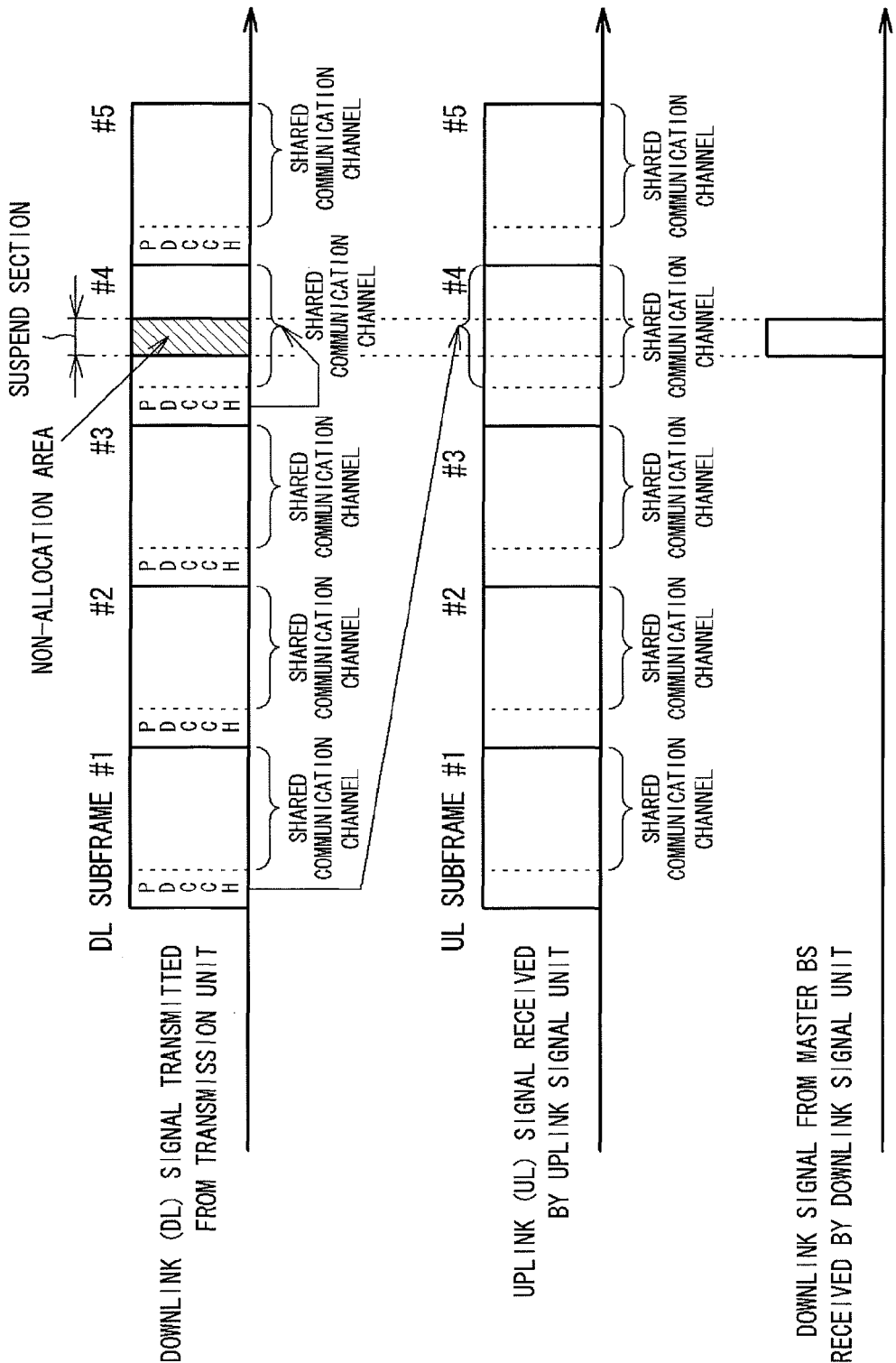
FIG. 11 is a diagram showing a manner of resource allocation.

As shown in FIG. 11, in LTE, at the beginning of the downlink (DL) subframe, a PDCCH (Physical Downlink Control Channel) is provided as a control channel.

It is to be noted that, in the downlink (DL) subframe, an area other than the PDCCH is a shared communication channel (PDSCH; Physical Downlink Shared Channel). Further, in the uplink (UL) subframe also, a control channel is secured at the beginning thereof, and an area other than that is a shared communication channel (PUSCH; Physical Uplink Shared Channel).

As described above, the shared communication channel is an area (resource) shared among a plurality of user terminals for communication, and structured with a plurality of resource blocks which are each the minimum unit of allocation to the user terminals. The resource blocks are small regions obtained by dividing the shared communication channel into a plurality of pieces. One or a plurality of resource blocks are allocated to a single user terminal, whereby a plurality of user terminals can simultaneously establish communication using one shared communication channel (subframes) (Multiple Access).

The PDCCH included in the DL subframe includes Downlink Scheduling Information which is resource block allocation information for the downlink, Uplink Scheduling Grant which is resource block allocation information for the uplink, and other control information.

As shown in FIG. 11, Downlink Scheduling Information (hereinafter referred to as "DSI") defines resource block allocation in a shared communication channel in the DL subframe having a PDCCH in which the DSI is included. For example, the DSI in the PDCCH of the DL subframe #4 shown in FIG. 11 defines the resource block allocation in the shared communication channel in this DL subframe #4.

Further, the Uplink Scheduling Grant (hereinafter referred to as "USG") defines resource block allocation in a shared communication channel in a UL subframe which is three subframes later than a DL subframe having a PDCCH in which the USG is included. For example, USG in a PDCCH of the DL subframe #1 in FIG. 11 defines resource block allocation in the shared communication channel in the UL subframe #4.

Resource block allocation for the downlink and the uplink is performed by the allocating unit 6a-1 of the resource allocation process unit 6a. The allocating unit 6a-1 of the present embodiment performs a special process for allocation of resource blocks in an over-the-air synchronization section or a measurement section, separately from normal resource allocation.

Figure 12:
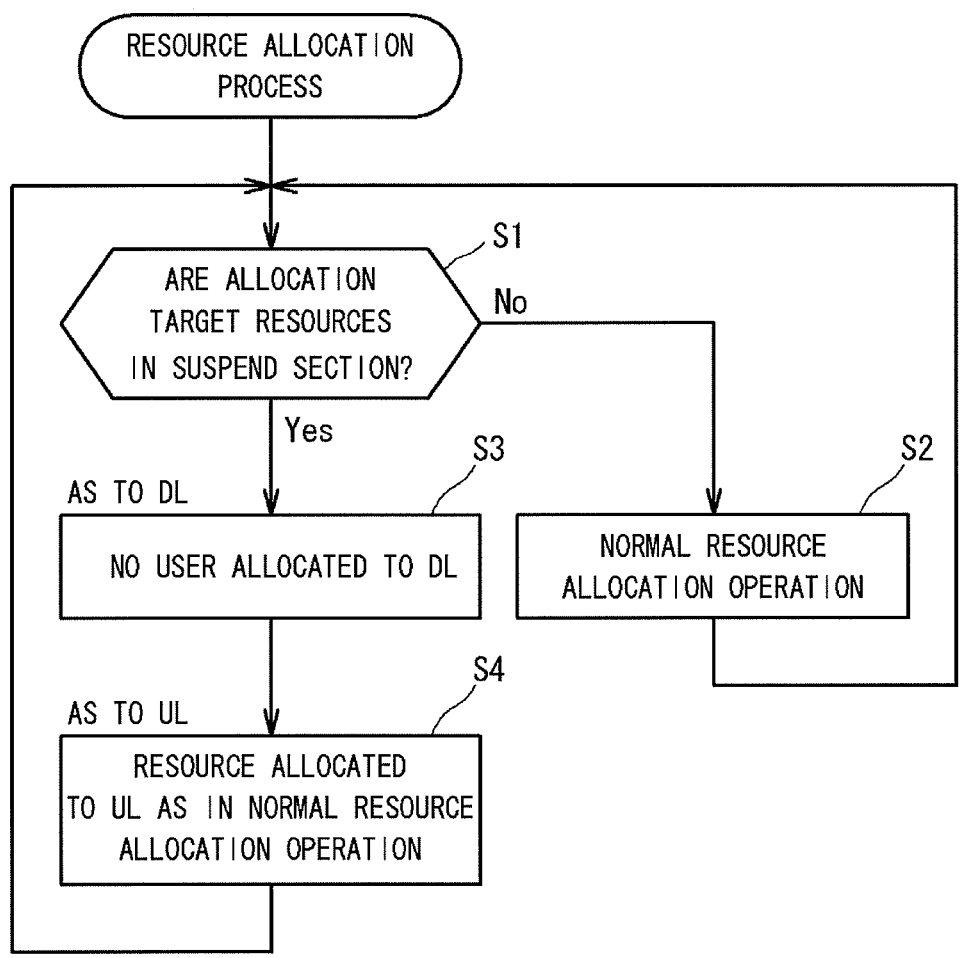
FIG. 12 is a flowchart of a resource allocation process.

FIGS. 11 and 12 show an exemplary manner of resource allocation.

As shown in FIG. 12, first, the determining unit 6a-1 of the resource allocation control unit 6a determines whether or not allocation target resource blocks are those in an over-the-air synchronization section (step S1). This determination is made in the following manner: the resource allocation control unit 6a acquires information indicative of over-the-air synchronization timing information (over-the-air synchronization section information; suspend section information) or information indicative of measurement timing (measurement section information; suspend section information) from the over-the-air synchronization control unit 6b or the measurement control unit 6c, and determines whether or not the allocation target resource blocks belong to the suspend section.

When the over-the-air synchronization process or the measurement process is performed, downlink signal transmission from the self base station apparatus is suspended, and a downlink signal transmitted by the other base station apparatus is received. Accordingly, the over-the-air synchronization section information or the measurement section information is also information indicative of the suspend section during which downlink signal transmission to the terminal devices is suspended.

When it is determined that allocation target resource blocks are not those in a suspend section in step S1, as a normal resource allocation operation, allocation of user terminals to the resource blocks is performed irrespective of downlink or uplink (step S2). That is, allocation of user terminals to the resource blocks is performed, and information (DSI, USG) indicative of the allocation is stored in a PDCCH.

On the other hand, when it is determined that (some or all) allocation target resource blocks belong to a suspend section in step S1, if the resource blocks are those for downlink (DL), then allocation of user terminals is not performed (step S3); whereas if the resource blocks are those for uplink (UL), then user allocation is performed (step S4).

As a result, as shown in FIG. 11, when an over-the-air synchronization section or a measurement section is present in the subframe #4, an area corresponding to the over-the-air synchronization section is treated as the non-allocation area, and thus, allocation information about the non-allocation area is not present in the PDCCH of the downlink DL subframe #4 having resource allocation information (DSI) about the shared communication channel of the downlink (DL) subframe #4.

On the other hand, in the PDCCH of the downlink DL subframe #4 having resource allocation information (USG) about a shared communication channel of the uplink (UL) subframe #4, resource allocation information about the entire shared communication channel of the uplink (UL) subframe #4 including a suspend section is present.

Since the resource allocation is performed in the foregoing manner, in the over-the-air synchronization section (suspend section), allocation to the terminal devices 2 itself is not performed in downlink (DL). Therefore, even when signal transmission itself from the transmission unit 11 in the over-the-air synchronization section (suspend section) is suspended to prevent interference with a downlink signal from the other base station apparatus, since there is no resource allocation to the terminal devices 2, even when the terminal devices 2 cannot receive signals from the base station apparatus 1, the terminal devices 2 can be prevented from recognizing such an event as a failure.

Further, in the present embodiment, since the downlink signal receiving unit 12 is provided separately from the uplink signal receiving unit 11, even in the over-the-air synchronization section, reception from the terminal devices 2 can be performed in the normal manner. Accordingly, as shown in FIG. 11, for the uplink, even in the over-the-air synchronization section, resource allocation can be performed.

It is to be noted that, as to the non-allocation area, no user terminals may be allocated. Alternatively, the user terminals that are smaller in number than the user terminals allocated in the normal allocation operation may be allocated. In this case, in those user terminals allocated with resource blocks in the non-allocation area, when signal transmission from the transmission unit 11 itself is suspended in an over-the-air synchronization section, those terminal devices 2 allocated with a resource in the over-the-air synchronization section may possibly recognize such an event as a failure. However, since the number of the terminal devices 2 allocated with the resource is small in the over-the-air synchronization section, disadvantageous effect can be suppressed.

Figure 13:
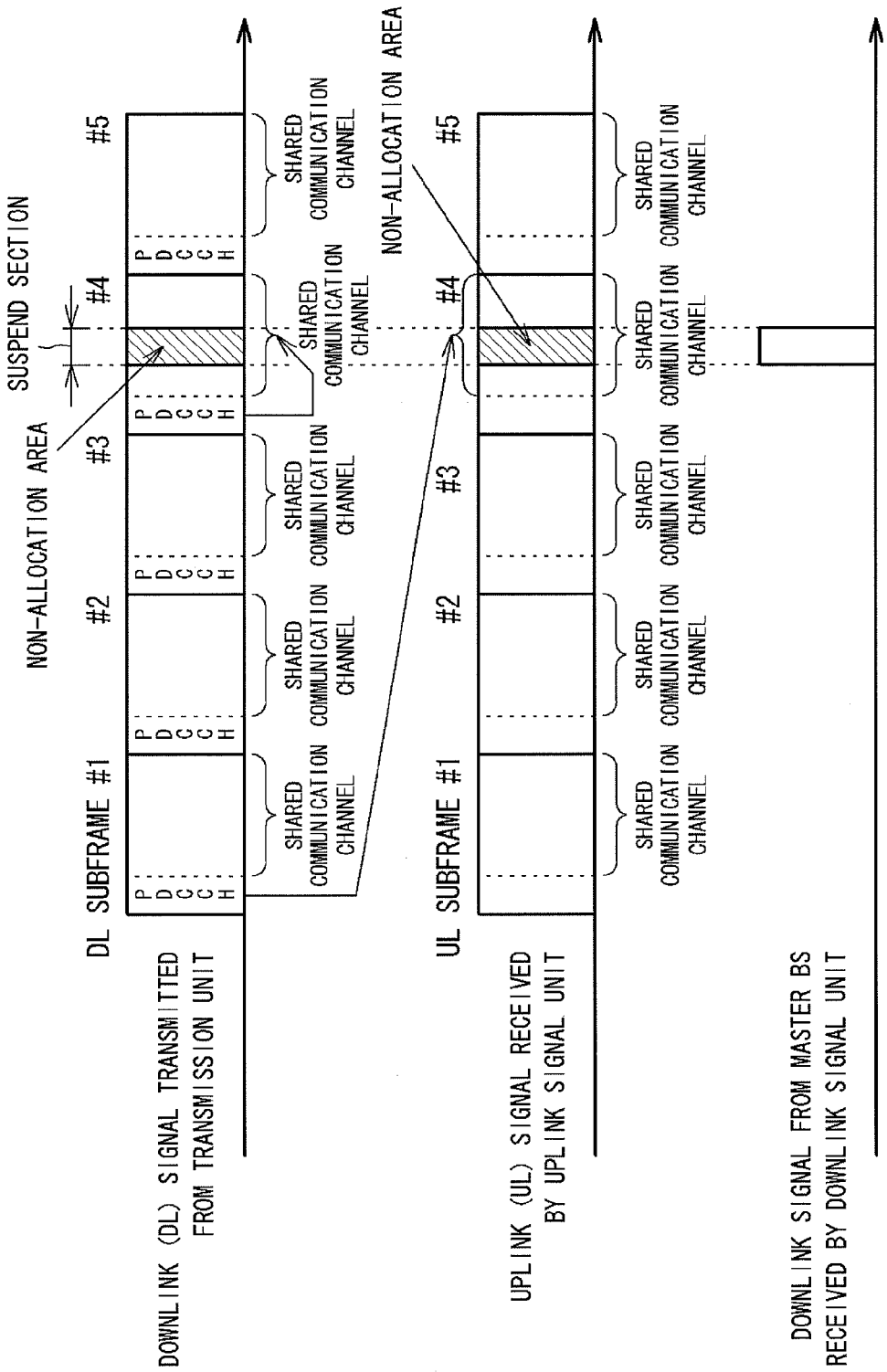
FIG. 13 is a diagram showing a manner of resource allocation.
Figure 14:
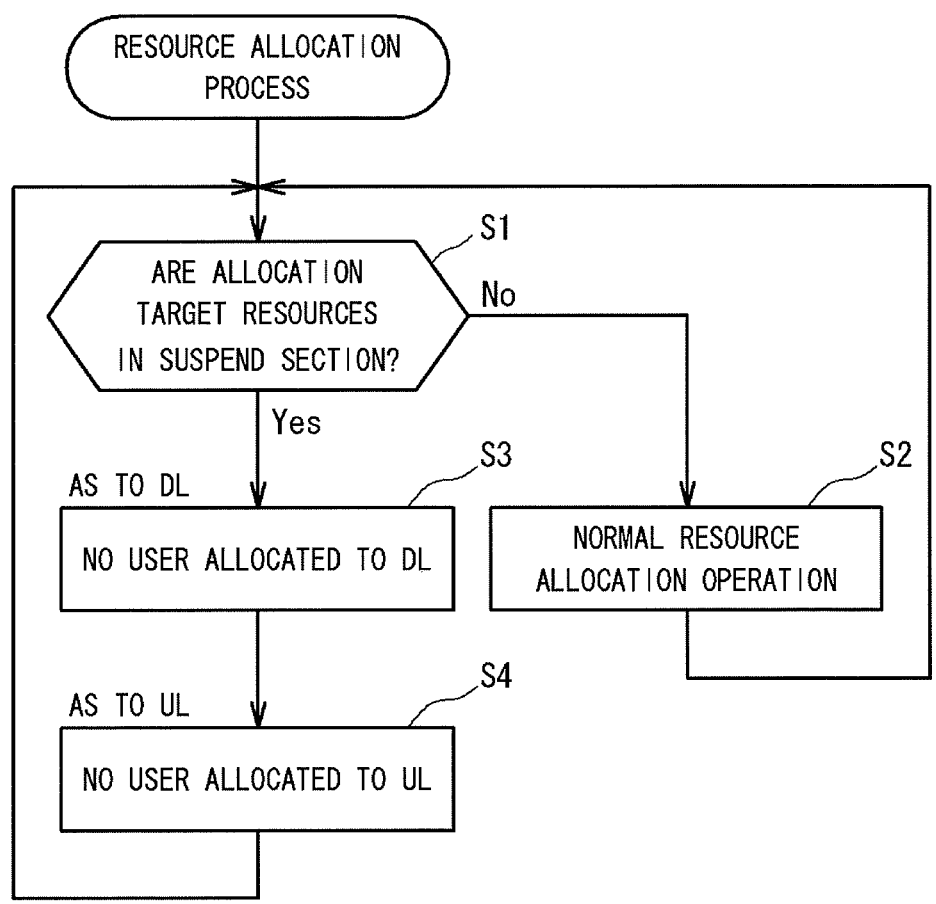
FIG. 14 is a flowchart of a resource allocation process.

FIGS. 13 and 14 show another exemplary manner of resource allocation. As shown in FIG. 5, when the uplink signal receiving unit 11 and the uplink signal receiving unit 12 are separately provided, uplink signals from terminal devices can be received also during reception of a downlink signal from the other base station apparatus. However, when the uplink signal receiving unit 11 and the uplink signal receiving unit 12 are partially shared (e.g., the A/D converter 117 and 127), uplink signals from the terminal devices cannot be received during reception of a downlink signal from the other base station apparatus.

The example shown in FIGS. 13 and 14 is resource allocation in such a case. The resource allocation process shown in FIG. 14 is substantially identical to the resource allocation process shown in FIG. 12 except for step S4.

In step S4 in FIG. 12, when (some or all) resource blocks being the allocation target are determined to belong to an over-the-air synchronization section, and the resource blocks are those for uplink (UL), user allocation is performed; on the other hand, in step S4 in FIG. 14, when (some or all) allocation target resource blocks are determined to belong to a suspend section and the resource blocks are those for downlink (DL), allocation of user terminals is not performed.

That is, as shown in FIG. 13, in a case where the uplink signal receiving unit 11 cannot receive uplink signals from the terminal devices 2 during when the downlink signal receiving unit 12 is receiving a downlink signal from the other base station apparatus 1 for the over-the-air synchronization or the measurement process, uplink resource blocks belonging to a suspend section are also in a non-allocation area.

Thus, it becomes possible to prevent the occurrence of an event where, in a section in which the base station apparatus 1 cannot receive uplink signals from the terminal devices 2 due to the over-the-air synchronization or the measurement process, the terminal devices 2 transmit information to the base station apparatus 1 using allocated resource block, and the base station apparatus 1 cannot receive the information.

It is to be noted that, while it is stated in the foregoing that a suspend section is set as part of sections of a single subframe, it may be sections of a whole subframe, or may be sections of a plurality of subframes.

The resource allocation control unit 6a allocates resources to the subframes in the foregoing manner, while suspension of the communication with the terminal devices 2 is carried out by the PHY unit and the RF unit. Accordingly, provided that the MAC unit 6 cannot accurately identify at which timing a suspend section occurs among the frame processing timings that the MAC unit 6 grasps, the resource allocation control unit 6a of the MAC unit 6 cannot accurately associate a non-allocation area with a suspend section.

Addressing this point, in the present embodiment, since the resource allocation control unit 6a of the MAC unit 6 acquires the suspend section information from the synchronization control unit 6b or the measurement control unit 6c provided at the MAC unit 6, at which timing a suspend section occurs can be grasped. As a result, as shown in FIG. 7, when the MAC unit 6 acquires the synchronization information (subframe number) from the PHY unit 5 and the frame counter 6d thereof is counted up, the resource allocation information that is to be stored in the control channel of the frame indicated by the value of the frame counter 6d can appropriately be provided to the PHY unit side.

Accordingly, for example, in a case where the synchronization control unit 6b or the measurement control unit 6c of the MAC unit 6 is to perform the over-the-air synchronization or the measurement process at the K-th subframe, when synchronization information indicative of the K-th subframe is reported from the PHY unit 5 to the MAC unit 6, the over-the-air synchronization control unit 6b or the measurement control unit 6c of the MAC unit 6 reports a trigger for performing the over-the-air synchronization process or the measurement process to the PHY unit 5 side. Here, the trigger is also provided to the resource allocation control unit 6a as the synchronization section information or the measurement section information (suspend section information) (see FIG. 10), and the suspend section can be set as a non-allocation area.

In addition, in the present embodiment, since the PHY unit 5 and the MAC unit 6 synchronize with each other, the resource allocation control unit 6a of the MAC unit 6 can accurately associate a non-allocation area with a suspend section. Provided that a synchronization error is present between the frame counter 5d of the PHY unit 5 and the frame counter 6d of the MAC unit 6, a shift occurs between the non-allocation area and the suspend section by the amount corresponding to the synchronization error. Such a situation is prevented in the present embodiment.

[6. Adaptive Control Over Period Corresponding to Over-the-Air Synchronization Process or Measurement Process]

The over-the-air synchronization control unit 6b and the measurement control unit 6c exert control of adaptively controlling the periods in which their respective processes are executed. It is to be noted that, the over-the-air synchronization process and the measurement process may simultaneously be executed, or may be executed independently of each other.

In the present embodiment, the over-the-air synchronization control unit 6b and the measurement control unit 6c adaptively control the timing (period) at which the over-the-air synchronization process and the measurement process are performed based on the report information generated by the synchronization processing unit 5a.

Figure 15:
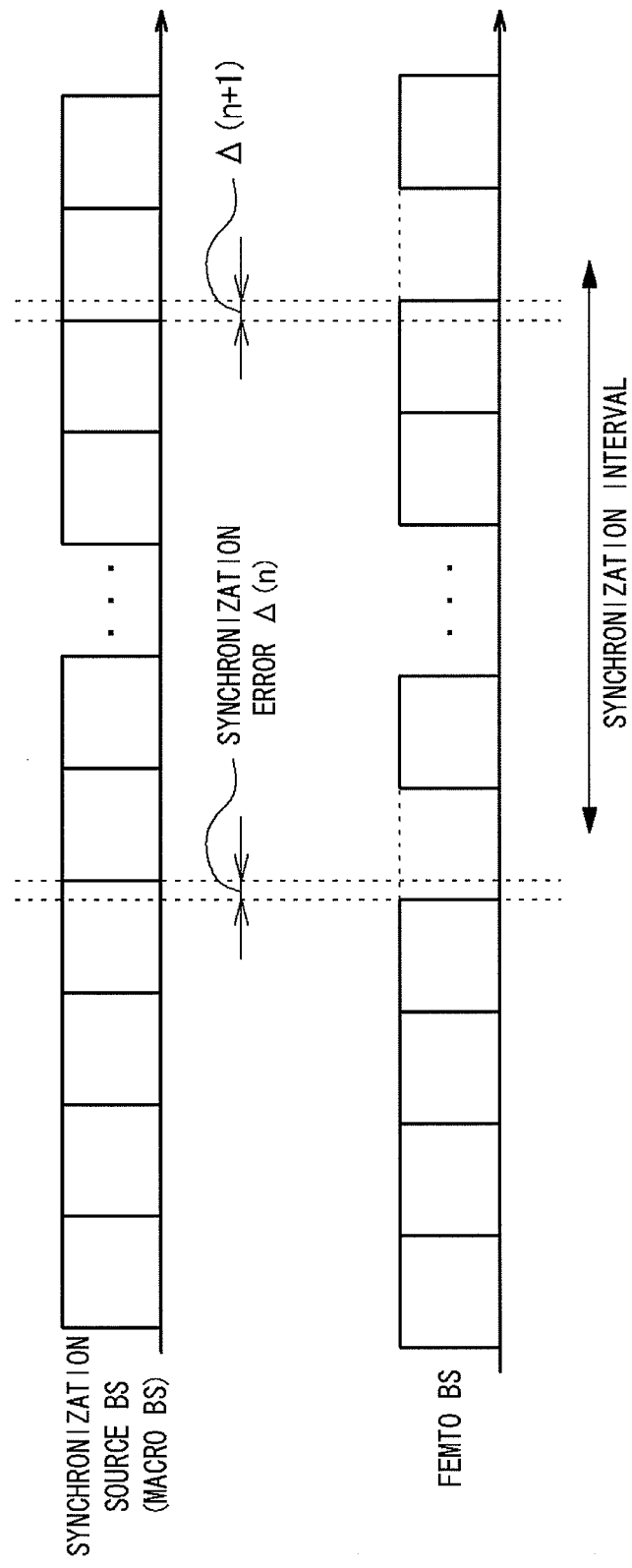
FIG. 15 is a diagram showing a synchronization error (timing offset) between base station apparatuses.

As shown in FIG. 15, every time the over-the-air synchronization process is executed, a synchronization error (timing offset) $\Delta$ (n) between the other base station serving as the synchronization source (synchronization source BS) and the self base station apparatus (femto BS) is detected. This synchronization error is stored in the memory 18 every time it is detected. Therefore, in the memory 18, the past plurality of (N pieces of) synchronization errors, i.e., $\Delta(n)$, $\Delta(n+1)$, ..., $\Delta(N)$, are accumulated. The report information generating unit 19 generates the report information based on a plurality of synchronization errors accumulated in the memory 18, and reports it to the control units 6b and 6c (see FIG. 7).

In the present embodiment, the report information is generated as the average value $|\Delta(n)|(n=1, \ldots, N)$ of the past plurality of (N pieces of) synchronization errors $\Delta(n)$, $\Delta(n+1), \ldots, \Delta(N)$.

Figure 16:
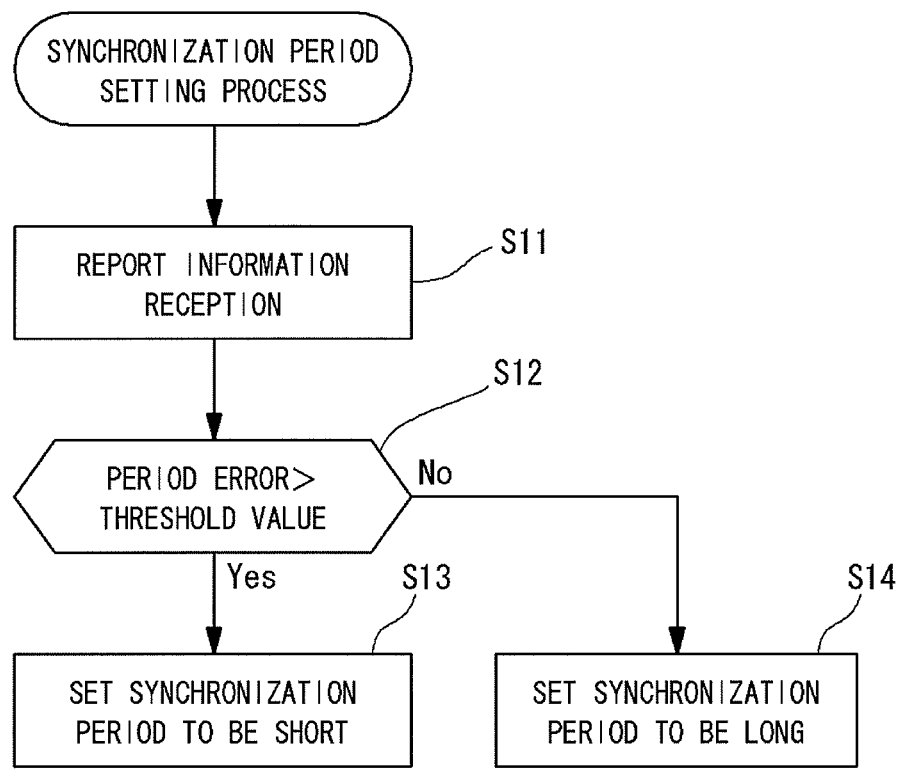
FIG. 16 is a flowchart showing a synchronization period determining process.

The timing (period) determining process using the report information is performed as shown in FIG. 16. Here, the description will be given taking up the synchronization control unit 6b as an example. When the synchronization control unit 6b receives the report information (step S11), it compares the synchronization error average value indicated by the report information against a prescribed threshold value (step S12). When the synchronization error average value is greater than the threshold value, it can be determined that it is a situation where a synchronization error is likely to occur. Hence, even at a sacrifice of communication with the terminal devices to a certain degree, the inter-base-station synchronization should more frequently be performed. Accordingly, the synchronization period is set to be short (step S13), so that the inter-base-station synchronization is more frequently be performed. Thus, even in a situation where the synchronization error tends to become great, since the inter-base-station synchronization is frequently performed, the synchronization error can be maintained to be small.

On the other hand, when the synchronization error average value is smaller than the threshold value, it can be determined that it is a situation where a synchronization error is unlikely to occur. Hence, in order to prioritize the communication with the terminal devices 2, the over-the-air synchronization period is set to be long (step S14). Thus, an improvement in communication quality with the terminal devices 2 is achieved.

As has been described above, in the present embodiment, since the synchronization interval is adaptively adjusted in accordance with the magnitude of the synchronization error, accuracy of the inter-base-station synchronization and the communication quality can appropriately be balanced.

Further, in the present embodiment, since the control units 6b and 6c are provided on the MAC processing apparatus 6 side structured with a CPU or the like, it is easier to realize the adaptive timing control as described above. That is, while the processing unit on the PHY processing apparatus 5 side processes a signal from the other base station apparatus, it is structured such that the report information generated by the processing unit can be acquired by the MAC processing apparatus 6. Therefore, the timing control can be performed by the MAC processing apparatus 6 which is capable of performing relatively complicated processes.

It is to be noted that the report information is not limited to the synchronization error average value, and any information that can be generated based on a transmission signal from the other base station apparatus, and that can serve as an index for the control units 6b and 6c to determine the timing (period) will suffice. For example, the report information may be a power value or an operating frequency of the transmission signal or the like of the other base station apparatus. Further, the information can merely be presence or absence of a transmission signal from the other base station apparatus.

Further, the timing control exerted by the control units 6b and 6c is not necessarily based solely on the report information, and it may be exerted based on other information, e.g., presence or absence of the terminal devices (or the number of the terminal devices) connected to the self base station apparatus, presence or absence of the terminal devices (or the number of the terminal devices) connected to the other base station apparatus and the like.

[7. Other Example of Base Station Apparatus]

Figure 17:
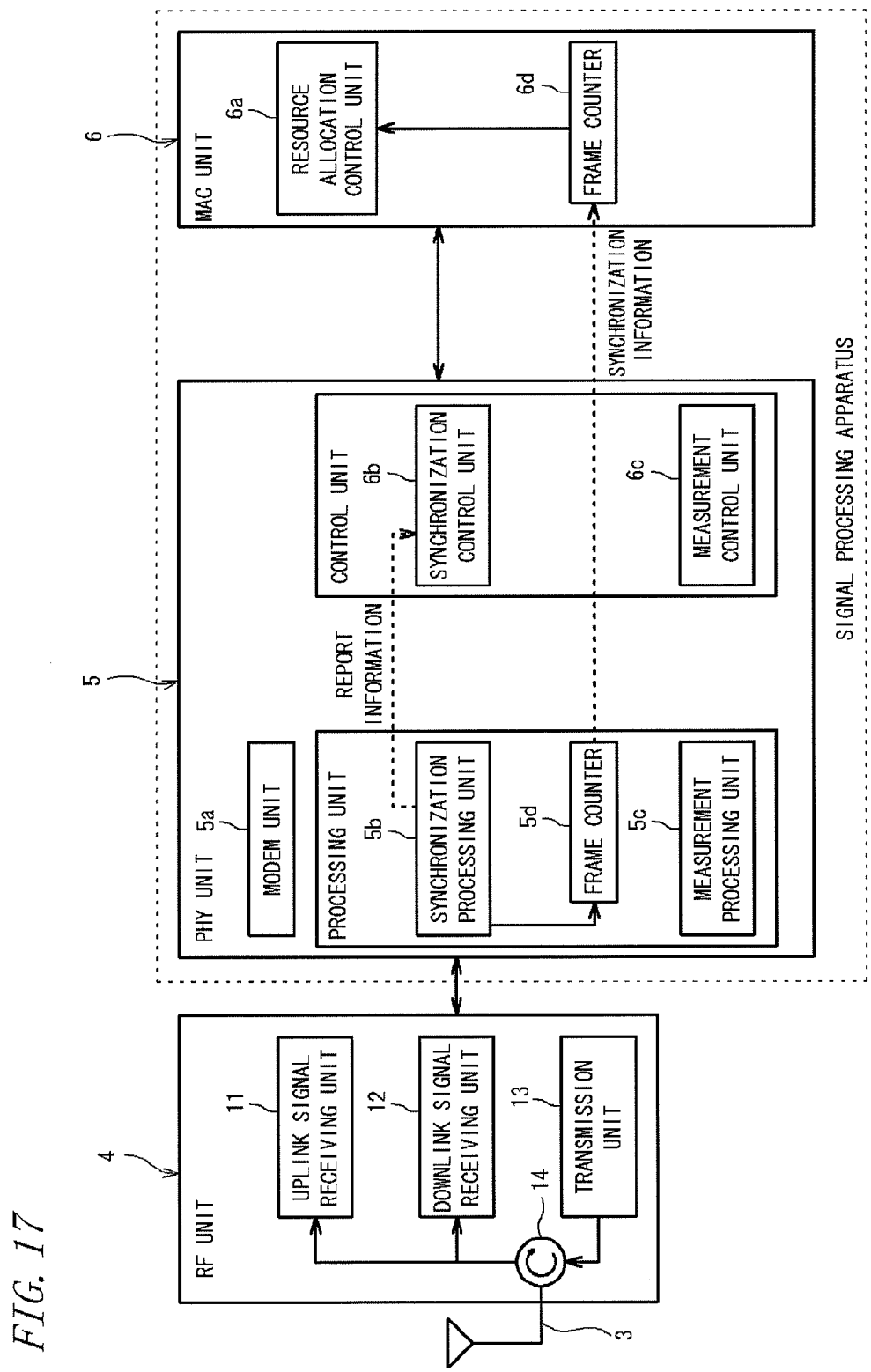
FIG. 17 is a block diagram showing another example of the structure of the base station apparatus.

FIG. 17 shows another example of the base station apparatus (femto base station). In the base station apparatus shown in FIG. 17, the control units 6b and 6c, which are provided at the MAC unit 6 in the base station apparatus shown in FIG. 4, are provided at the PHY unit 5. Since the PHY unit 5 is structured based on DSP, it is relatively difficult to structure the control units 6b and 6c that exert the adaptive timing control. However, even in the PHY unit 5, those that perform a timing process of executing the over-the-air synchronization process or the measurement process at a regular timing can relatively easily be realized.

When timing of the over-the-air synchronization process or the measurement process has come, the control unit of the PHY unit reports the trigger thereof to the synchronization processing unit 5b or the measurement processing unit 5c, and also to the resource allocation control unit 6a of the MAC processing apparatus 6.

In the base station apparatus shown in FIG. 17 also, the synchronization information is reported from the frame counter 5d of the PHY unit 5 to the frame counter 6d of the MAC unit 6, and the inter PHY-MAC synchronization is secured. Accordingly, the resource allocation control unit 6a can perform appropriate resource allocation including the suspend section.

It is to be noted that, those structures in FIG. 17 of which a description has not been given are the same as those shown in FIG. 4.

It is to be noted that the embodiments disclosed herein are to be considered in all respects as illustrative and not restrictive. The scope of the present invention is indicated by the appended claims rather than by the foregoing meaning, and all changes which come within the meaning and range of equivalency of the claims are therefore intended to be embraced therein.

REFERENCE SIGNS LIST

1: BASE STATION APPARATUS
2: TERMINAL DEVICE
5: PHY UNIT (PHY PROCESSING APPARATUS)
6: MAC UNIT (MAC PROCESSING APPARATUS)
5a: MODEM UNIT
5b: SYNCHRONIZATION PROCESSING UNIT
5c: MEASUREMENT PROCESSING UNIT
5d: TIMING COUNTER
6a: RESOURCE ALLOCATION CONTROL UNIT
6b: SYNCHRONIZATION CONTROL UNIT
6c: MEASUREMENT CONTROL UNIT
6d: FRAME COUNTER
19: REPORT INFORMATION GENERATING UNIT

The invention claimed is:

1. A base station apparatus, comprising:
a PHY processing apparatus that performs a process related to a communicational PHY layer; and
a MAC processing apparatus that performs a process related to a communicational MAC layer, wherein
the PHY processing apparatus includes a synchronization processing unit that performs a synchronization process for synchronizing a communication frame processing timing of the PHY processing apparatus with a communication frame processing timing of other base station apparatus serving as a synchronization source, and
the synchronization processing unit suspends transmission from the base station apparatus to a terminal device according to a timing that synchronization-processing-timing-information indicates; synchronization-processing-timing-information is reported from the MAC processing unit,
the synchronization processing unit performs the synchronization process based on a transmission signal from the other base station apparatus; the transmission signal is received by the base station while transmission from the base station apparatus to the terminal device is suspended,
the MAC processing apparatus includes a synchronization control unit that determines a timing for causing the synchronization processing unit to execute the synchronization process and reports information indicative of the determined timing as the synchronization-processing-timing-information to the PHY processing unit in a state where a communication frame processing timing of the MAC processing apparatus is synchronized with the communication frame processing timing of the PHY processing apparatus.

2. The base station apparatus according to claim 1, wherein the MAC processing apparatus includes a resource allocation control unit that controls resource allocation in a communication frame, and
the resource allocation control unit restricts the resource allocation for a period during which transmission from the base station apparatus to a terminal device for a synchronization process performed by the synchronization processing unit is suspended.

3. The base station apparatus according to claim 1, wherein the base station is configured to perform a process to suspend transmission from the base station apparatus to the terminal device and reception from the terminal device according to the timing that synchronization-processing-timing-information indicates.

4. The base station apparatus according to claim 1, wherein the synchronization processing unit calculates an error between its own communication frame processing timing and the communication frame processing timing of the other base station apparatus based on the signal transmitted from the other base station apparatus serving as the synchronization source, and corrects the communication frame processing timing of the PHY processing apparatus based on the error, to thereby perform the synchronization process.

5. The base station apparatus according to claim 1, wherein the synchronization processing unit of the PHY processing apparatus calculates the error between its own communication frame processing timing and the communication frame processing timing of the other base station apparatus based on the transmission signal received from the other base station apparatus while transmission from the base station apparatus to the terminal device is suspended according to the timing that synchronization-processing-timing-information indications, and corrects the communication frame processing timing of the PHY processing apparatus based on the error, to thereby perform the synchronization process.

6. The base station apparatus according to claim 1, wherein the synchronization control unit adaptively controls the timing for causing the synchronization processing unit to execute the synchronization process.

7. A signal processing apparatus to be used in a base station, comprising:
a PHY processing apparatus that performs a process related to a communicational PHY layer;
a MAC processing apparatus that performs a process related to a communicational MAC layer, wherein
the PHY processing apparatus includes a synchronization processing unit that performs a synchronization process for synchronizing a communication frame processing timing of the PHY processing apparatus with a communication frame processing timing of other base station apparatus serving as a synchronization source, and
the synchronization processing unit suspends transmission from the base station apparatus to a terminal device according to a timing that synchronization-processing-timing-information indicates; synchronization-processing-timing-information is reported from the MAC processing unit,
the synchronization processing unit performs the synchronization process based on a transmission signal from the other base station apparatus; the transmission signal is received by the base station while transmission from the base station apparatus to the terminal device is suspended,
the MAC processing apparatus includes a synchronization control unit that determines a timing for causing the synchronization processing unit to execute the synchronization process and reports information indicative of the determined timing as the synchronization-processing-timing-information to the PHY processing unit in a state where a communication frame processing timing of the MAC processing apparatus is synchronized with the communication frame processing timing of the PHY processing apparatus.

8. A PHY processing apparatus for a base station apparatus that performs a process related to a communicational PHY layer, comprising:
a synchronization processing unit that performs a synchronization process for synchronizing a communication frame processing timing of the PHY processing apparatus with a communication frame processing timing of other base station apparatus serving as a synchronization source, wherein
the synchronization processing unit suspends transmission from the base station apparatus to a terminal device according to a timing that synchronization-processing-timing-information indicates; synchronization-processing-timing-information is reported from a MAC processing unit that performs a process related to a communication MAC layer,
the synchronization processing unit performs the synchronization process based on a transmission signal from the other base station apparatus; the transmission signal is received by the base station while transmission from the base station apparatus to the terminal device is suspended,
the PHY processing apparatus reports, to a MAC processing apparatus, synchronization information for synchronizing a communication frame processing timing of the MAC processing apparatus with the communication frame processing timing of the PHY processing apparatus.

9. A MAC processing apparatus for base station apparatus that performs a process related to a communicational MAC layer, wherein
the MAC processing apparatus synchronizes a communication frame processing timing of the MAC processing apparatus with a communication frame processing timing of the PHY processing apparatus according to synchronization information from a PHY processing apparatus that has a function of performing a synchronization process for achieving synchronization with a communication frame processing timing of other base station apparatus serving as a synchronization source, and
the MAC processing apparatus includes a synchronization control unit that determines a timing for causing the synchronization processing unit to execute the synchronization process and reports information indicative of the determined timing as the synchronization-processing-timing-information to the PHY processing unit in a state where a communication frame processing timing of the MAC processing apparatus is synchronized with the communication frame processing timing of the PHY processing apparatus.

10. A base station apparatus, comprising:
a PHY processing apparatus that performs a process related to a communicational PHY layer; and
a MAC processing apparatus that performs a process related to a communicational MAC layer, wherein
the PHY processing apparatus includes a processing unit that processes a transmission signal from other base station apparatus,
the MAC processing apparatus includes a control unit that determines a timing that the transmission signal from the other base station apparatus is processed at the processing unit of the PHY processing apparatus, to report processing-timing-information indicative of the determined timing to the PHY processing apparatus,
the processing unit of the PHY processing apparatus generates report information used for controlling the timing based on the transmission signal from the other base station apparatus; the transmission signal is received by the base station while transmission from the base station apparatus to a terminal device is suspended according to the timing that processing-timing-information reported from a MAC processing unit indicates, and
the processing unit reports the report information to the MAC processing apparatus, and
the control unit of the MAC processing apparatus determines the timing based on the report information reported by the PHY processing apparatus.

11. The base station apparatus according to claim 10, wherein the processing unit of the PHY processing apparatus includes a synchronization processing unit that performs a synchronization process for achieving inter-base-station synchronization with the other base station apparatus based on the transmission signal from the other base station apparatus;

the transmission signal is received by the base station while transmission from the base station apparatus to the terminal device is suspended.

12. The base station apparatus according to claim 11, wherein the processing unit generates the report information based on a synchronization error between itself and the other base station apparatus.

13. The base station apparatus according to claim 12, wherein the control unit of the MAC processing apparatus sets a period during which the synchronization process is performed to be shorter as the synchronization error indicated by the report information is greater.

14. The base station apparatus according to claim 11, wherein the processing unit of the PHY processing apparatus includes a measurement processing unit that performs a process of measuring the signal from the other base station apparatus;

the signal is received by the base station while transmission from the base station apparatus to the terminal device is suspended.

\* \* \* \* \*